US012651520B2

(12) United States Patent
Wang et al.

(10) Patent No.: US 12,651,520 B2
(45) Date of Patent: Jun. 9, 2026

(54) POWER DEVICE

(71) Applicant: CYBER POWER SYSTEMS, INC.,
Taipei City (TW)

(72) Inventors: Hung-Chih Wang, Taipei City (TW);
Cheng-Yen Lo, Taipei City (TW)

(73) Assignee: CYBER POWER SYSTEMS, INC.,
Taipei City (TW)

( * ) Notice: Subject to any disclaimer, the term of this
patent is extended or adjusted under 35
U.S.C. 154(b) by 86 days.

(21) Appl. No.: 18/756,357

(22) Filed: Jun. 27, 2024

(65) Prior Publication Data

US 2025/0336282 A1      Oct. 30, 2025

(30) Foreign Application Priority Data

Apr. 26, 2024    (CN) ......................... 202420899834.X

(51) Int. Cl.
*G08B 21/18*        (2006.01)
*G08B 3/10*        (2006.01)
*H02J 7/82*        (2026.01)
*H02J 9/06*        (2006.01)

(52) U.S. Cl.
CPC ............. G08B 21/185 (2013.01); G08B 3/10
(2013.01); H02J 7/82 (2026.01); H02J 9/062
(2013.01)

(58) Field of Classification Search
CPC ....... G08B 21/185; G08B 3/10; H02J 7/0048;
H02J 9/062

USPC ..................................................... 307/66, 64
See application file for complete search history.

(56) References Cited

U.S. PATENT DOCUMENTS

| | | | | |
|---|---|---|---|---|
| 5,982,596 A | * | 11/1999 | Spencer ................. | H02H 3/006 |
| | | | | 361/64 |
| 10,790,662 B2 | * | 9/2020 | Sharifipour ............... | H02J 3/38 |
| 2009/0051508 A1 | * | 2/2009 | Yamano ................... | G08B 3/10 |
| | | | | 340/384.1 |
| 2013/0016845 A1 | * | 1/2013 | Bryan .................. | G10H 1/0091 |
| | | | | 381/63 |
| 2019/0067989 A1 | * | 2/2019 | Beg ......................... | H02J 3/381 |
| 2022/0376547 A1 | * | 11/2022 | Yang ................. | H02J 7/007194 |

* cited by examiner

*Primary Examiner* — Michael R. Fin
(74) *Attorney, Agent, or Firm* — BACON & THOMAS,
PLLC

(57)        ABSTRACT

A power device comprises a speaker, an audio circuit and a
control unit. The speaker comprises a first input terminal,
and is configured to emit sound according to the signal
received by the first input terminal. The audio circuit com-
prises a first output terminal, and the first output terminal is
electrically coupled to the first input terminal. The audio
circuit stores a plurality of audio files, and each audio file
corresponds to an alert sound. Each alert sound comprises at
least two pitches, and each pitch corresponds to a PWM
frequency. The audio circuit is also configured to select one
of the audio files according to a control command, generate
a first PWM signal according to the selected audio file, and
output the first PWM signal from the first output terminal.
The control unit is configured to generate a corresponding
control command according to a determination result.

32 Claims, 20 Drawing Sheets

POWER DEVICE

BACKGROUND OF THE INVENTION

Field of the Invention

The present invention relates to the technical field of power supply, and more particularly to a power device.

Description of Related Art

Uninterruptible power system (UPS) is configured to provide backup power to equipment (such as computers, servers or medical equipment) when the AC mains fails, so that the equipment can still operate normally. Therefore, it is very important to users to obtain the current state and behavior of the UPS in real time so that the user can take corresponding actions to ensure the normal operation of the UPS.

SUMMARY OF THE INVENTION

An object of the present invention is to provide a power device that allows users to obtain the current state and behavior of the power device in real time.

To achieve the above objective, the present invention provides a power device, which comprises a speaker, an audio circuit and a control unit. The speaker comprises a first input terminal, and is configured to emit sound according to the signal received by the first input terminal. The audio circuit comprises a first output terminal, and the first output terminal is electrically coupled to the first input terminal. The audio circuit stores a plurality of audio files, and each audio file corresponds to an alert sound. Each alert sound comprises at least two pitches, and each pitch corresponds to a PWM frequency. The audio circuit is also configured to select one of the audio files according to a control command, generate a first PWM signal according to the selected audio file, and output the first PWM signal from the first output terminal. The control unit is configured to generate a corresponding control command according to a determination result.

In one embodiment of the present invention, the power device is a UPS.

In another embodiment of the present invention, the power device is a PDU.

In still another embodiment of the present invention, the power device is an ATS.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
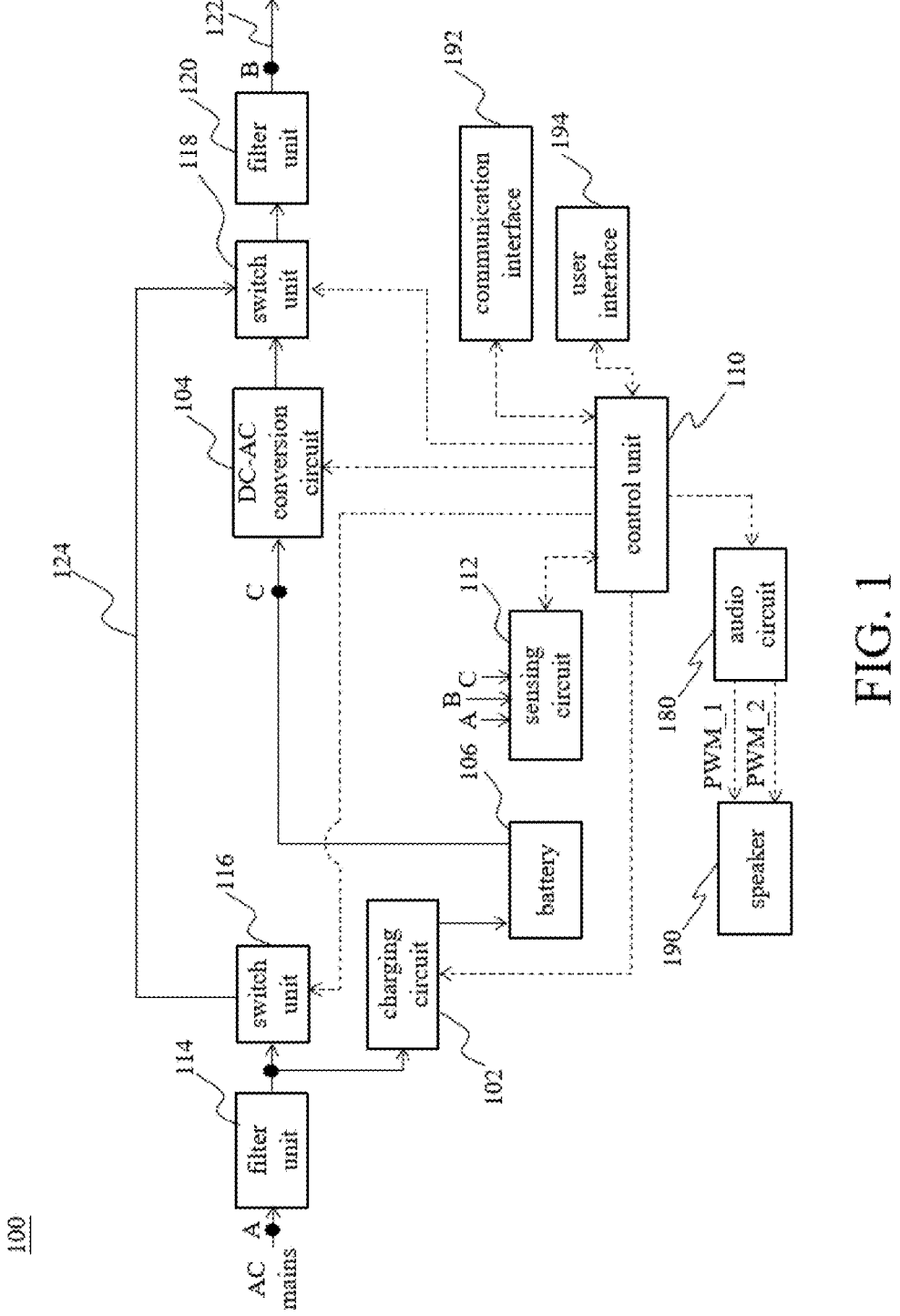
FIG. 1 illustrates a power device according to an embodiment of the present invention.

FIG. 1 illustrates a power device according to an embodiment of the present invention. As shown in FIG. 1, the power device 100 is a UPS. It can be seen from the circuit structure shown in FIG. 1 that the power device 100 is an off-line UPS. The power device 100 comprises a filter unit 114, a switch unit 116, a DC-AC conversion circuit 104, a switch unit 118, a filter unit 120, a charging circuit 102, a battery 106, a sensing circuit 112, a control unit 110, an audio circuit 180, a speaker 190, a communication interface 192, a user interface 194 and a bypass path 124.

The switch unit 116 is electrically coupled to one terminal of the bypass path 124, and is electrically coupled to the AC power source (e.g., AC mains) through the filter unit 114. The switch unit 118 is electrically coupled to the other terminal of the bypass path 124, and is electrically coupled to the output terminal 122 of the UPS through the filter unit 120. The charging circuit 102 is electrically coupled to the battery 106 and electrically coupled to the AC power source through the filter unit 114. The DC-AC conversion circuit 104 is electrically coupled between the battery 106 and the switch unit 118. In addition, the audio circuit 180 is electrically coupled to the speaker 190, and the switch unit 116, the switch unit 118, the charging circuit 102, the DC-AC conversion circuit 104, the communication interface 192, the user interface 194 and the audio circuit 180 are electrically coupled to the control unit 110 to be controlled by the control unit 110. For example, the control unit 110 can control the operation of the switch unit 118 to decide to electrically couple the output terminal of the DC-AC conversion circuit 104 to the filter unit 120, or to electrically couple the bypass path 124 to the filter unit 120.

In this embodiment, the sensing circuit 112 is further electrically coupled to the aforementioned AC power source, the output terminal 122 of the UPS and the input terminal of the DC-AC conversion circuit 104 (as indicated by coupling points A, B and C, respectively) to obtain a sensing result and transmit the sensing result to the control unit 110, so that the control unit 110 can determine a current state of the UPS accordingly. Furthermore, in this embodiment, the audio circuit 180 comprises a first output terminal and a second output terminal. The audio circuit 180 stores a plurality of audio files, each audio file corresponds to an alert sound, each alert sound comprises at least two pitches, and each pitch corresponds to a PWM frequency. The audio circuit 180 is also configured to select one of the audio files according to a control command, generate a first PWM signal PWM_1 and a second PWM signal PWM_2 according to the selected audio file, and output the first PWM signal PWM_1 and the second PWM signal PWM_2 from the first output terminal and the second output terminal of the audio circuit 180, respectively. In this embodiment, the speaker 190 comprises a first input terminal and a second input terminal, and the first input terminal and the second input terminal of the speaker 190 are electrically coupled to the first output terminal and the second output terminal of the audio circuit 180, respectively. The speaker 190 is configured to emit sound according to the signals received by its first input terminal and the second input terminal. In addition, the control unit 110 is also configured to generate a corresponding control command (described in detail later) according to a determination result, and transmit the generated control command to the audio circuit 180.

Figure 2:
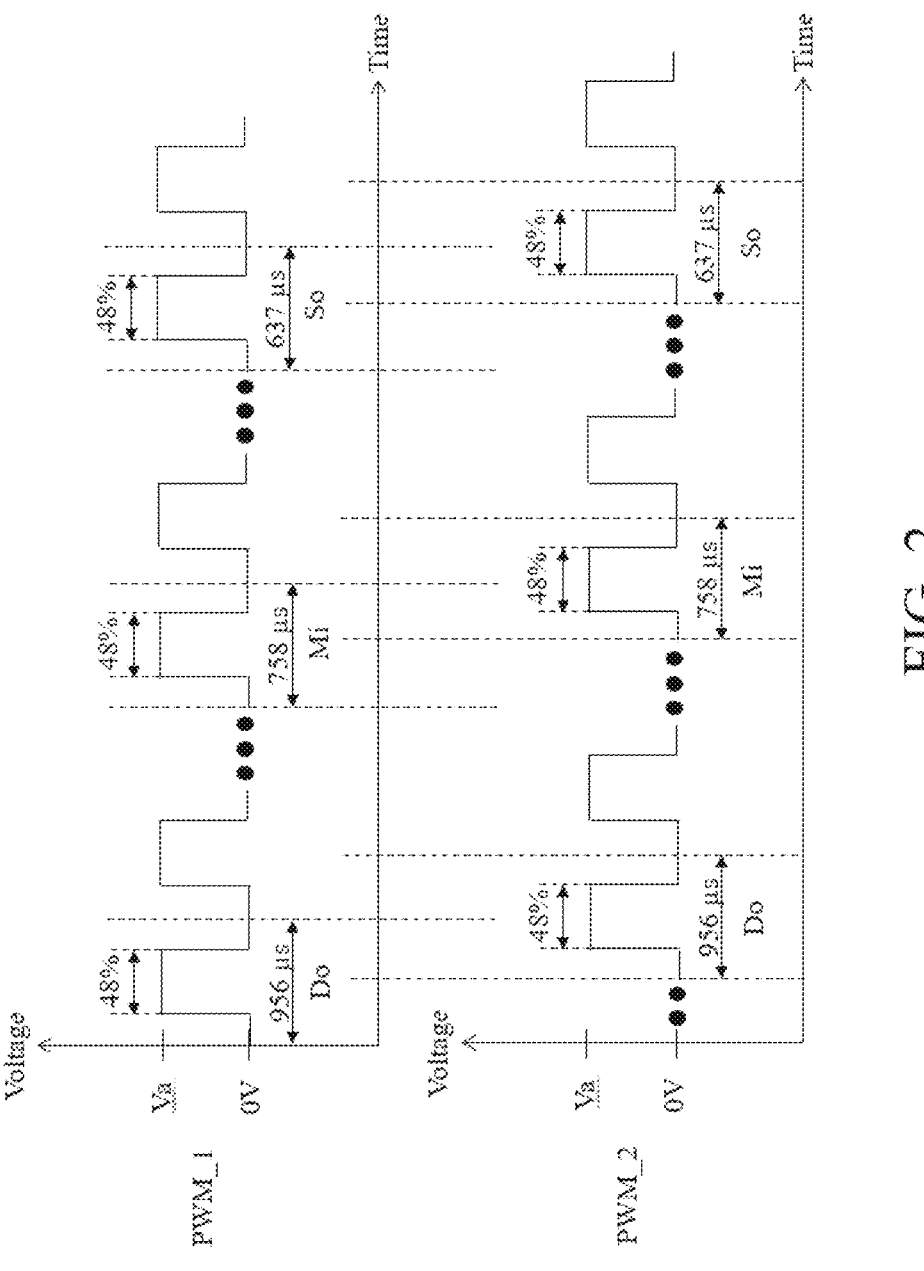
FIG. 2 is used to illustrate a first PWM signal PWM_1 and a second PWM signal PWM_2 corresponding to one of the alert sounds.
Figure 3:
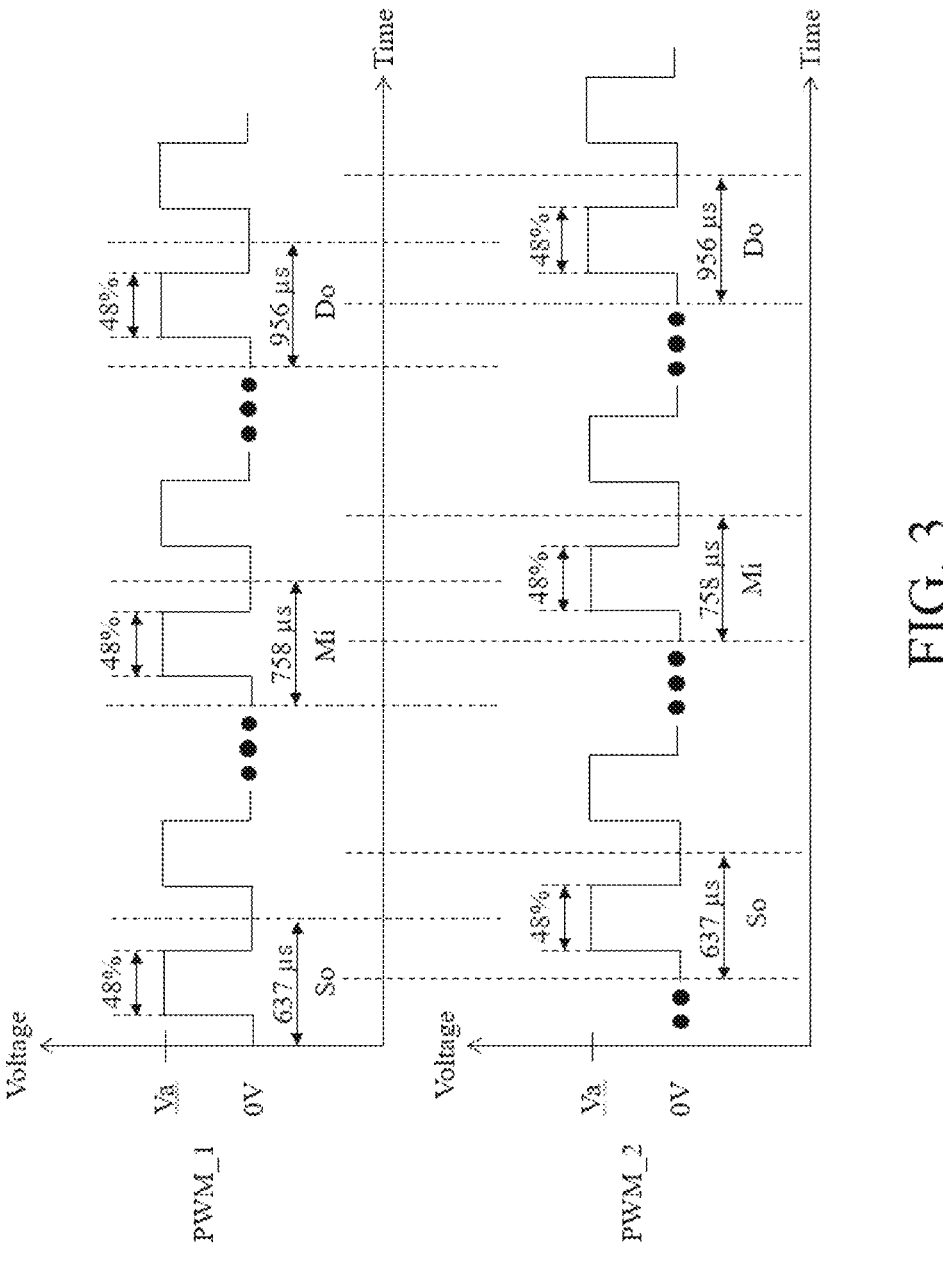
FIG. 3 is used to illustrate a first PWM signal PWM_1 and a second PWM signal PWM_2 corresponding to another one of the alert sounds.

FIG. 2 is used to illustrate a first PWM signal PWM_1 and a second PWM signal PWM_2 corresponding to one of the alert sounds. As shown in FIG. 2, the levels of the first PWM signal PWM_1 and the second PWM signal PWM_2 change between 0V and Va, and the timing of the second PWM signal PWM_2 is different from the timing of the first PWM signal PWM_1. In addition, the duty cycles of the first PWM signal PWM_1 and the second PWM signal PWM_2 do not exceed 50%, and the times when the two PWM signals present high levels do not completely overlap with each other, so that the speaker 190 can function normally. In this embodiment, the duty cycles of the first PWM signal PWM_1 and the second PWM signal PWM_2 are both maintained at 48%. In a preferred embodiment, the duty cycles of the first PWM signal PWM_1 and the second PWM signal PWM_2 are both 10%. As shown in FIG. 2, when the frequencies of the two PWM signals are 956 μs (microseconds), the speaker 190 emits a sound with a pitch of Do; when the frequencies of the two PWM signals are 758 μs, the speaker 190 emits a sound with a pitch of Mi; and when the frequencies of the two PWM signals are 637 μs, the speaker 190 emits a sound with a pitch of So. Since the frequency changes of the two PWM signals are 956 μs, 758 μs and 637 μs in sequence, the speaker 190 emits an alert sound with pitches of Do, Mi and So in sequence. FIG. 3 is used to illustrate a first PWM signal PWM_1 and a second PWM signal PWM_2 corresponding to another one of the alert sounds. As shown in FIG. 3, the frequency changes of the first PWM signal PWM_1 and the second PWM signal PWM_2 are 637 μs, 758 μs and 956 μs in sequence, so the speaker 190 emits an alert sound with pitches of So, Mi and Do in sequence.

As can be seen from the description of FIGS. 2 and 3, different alert sounds can be used to represent different states of the UPS, and can also be used to represent different behaviors of the UPS. Therefore, users can instantly obtain and identify the current state of the UPS according to the alert sound emitted by the speaker 190, or obtain and identify the current behavior of the UPS according to the alert sound emitted by the speaker 190.

In addition, although the two alert sounds described in FIGS. 2 and 3 have three pitches of Do, Mi and So, this is only used as an example and is not intended to limit the invention. That is to say, which pitches are comprised in an alert sound corresponding to an audio file, the order of the pitches, the time length of each pitch, and the number of times each pitch appears can be changed according to actual design requirements. For example, an alert sound can be designed to have a pitch combination of Mi, Fa and Sol in sequence, or a pitch combination of Fa, Mi, Fa and La in sequence, or a pitch combination of La and Si. From the above description, those of ordinary skill in the art should know that as long as an alert sound has at least two pitches, it is within the scope of protection of the present invention. In addition, the volume of each pitch can also be changed according to actual design requirements, this can be achieved by changing the voltage level of Va. The higher the voltage level Va, the louder the speaker 190 sounds.

In addition, it is conceivable that if there are a plurality of UPSs in the same field, users only need to set different alert sounds for these UPSs for the same state or the same behavior, so that users can clearly identify which UPS has emitted an alert sound, and determine the state or behavior of the UPS according to the alert sound they heard.

Figure 4:
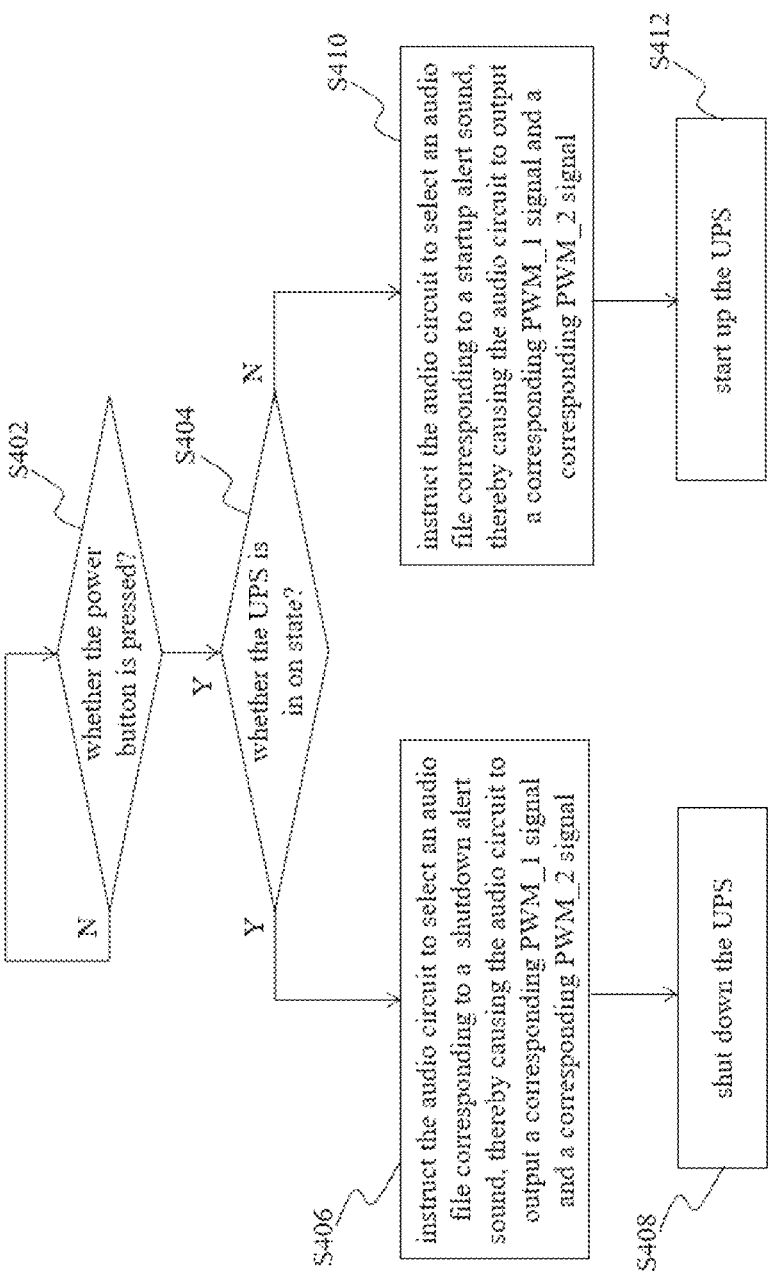
FIG. 4 shows a process for illustrating one of the alert sound applications of the power device 100.

FIG. 4 shows a process for illustrating one of the alert sound applications of the power device 100. Please refer to FIGS. 4 and 1. First, the control unit 110 determines whether the power button of the UPS is pressed (as shown in step S402). In step S402, when the determination result is no, the control unit 110 returns to step S402; when the determination result is yes, the control unit 110 determines whether the UPS is in on state (as shown in step S404). When the determination result in step S404 indicates that the UPS is in the on state, the control unit 110 instructs the audio circuit 180 to select an audio file corresponding to a shutdown alert sound, so that the audio circuit 180 outputs a corresponding first PWM signal PWM_1 and a corresponding second PWM signal PWM_2 (as shown in step S406), thereby causing the speaker 190 to emit the shutdown alert sound, such as to emit the alert sound described in FIG. 2. Then, the control unit 110 shuts down the UPS (as shown in step S408).

On the contrary, when the determination result in step S404 shows that the UPS is not in on state, the control unit 110 instructs the audio circuit 180 to select an audio file corresponding to a startup alert sound, so that the audio circuit 180 outputs a corresponding first PWM signal PWM_1 and a corresponding second PWM signal PWM_2 (as shown in step S410), thereby causing the speaker 190 to emit the startup alert sound. Certainly, the alert sound corresponding to the UPS in on state is different from the alert sound corresponding to the UPS in off state, for example, the alert sound as described in FIG. 3 is emitted. Then, the control unit 110 starts up the UPS (as shown in step S412).

Figure 5:
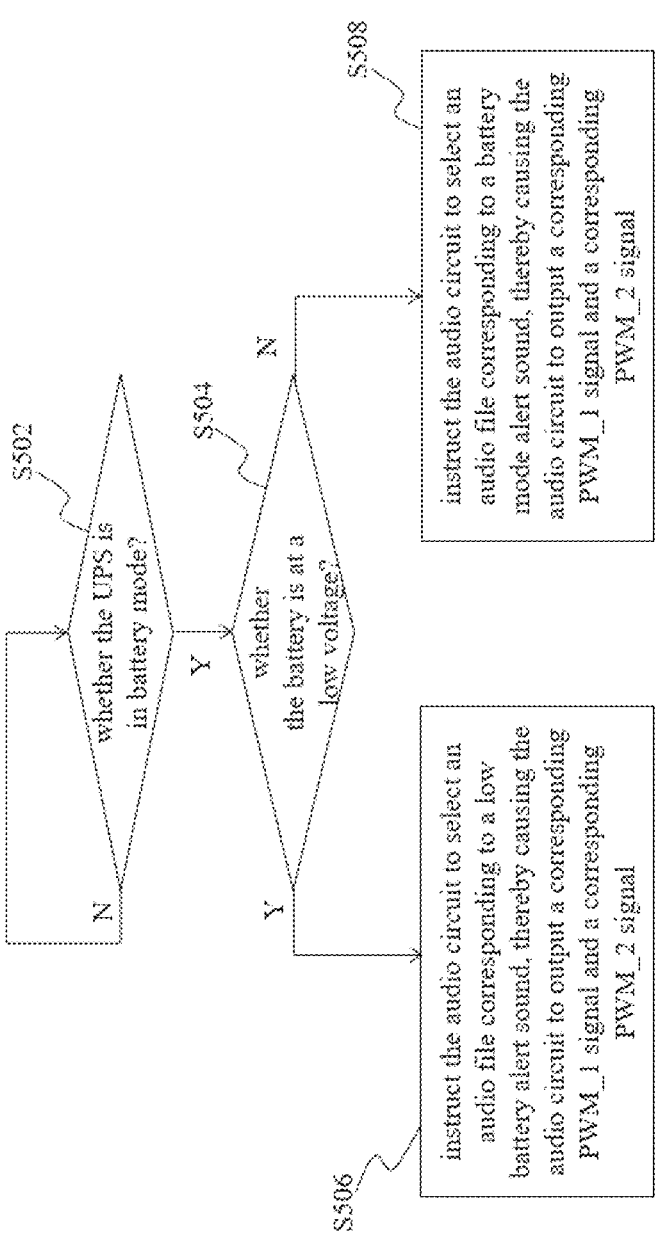
FIG. 5 shows a process for illustrating another one of the alert sound applications of the power device 100.

FIG. 5 shows a process for illustrating another one of the alert sound applications of the power device 100. Please refer to FIGS. 5 and 1. First, the control unit 110 determines whether the UPS is in battery mode (as shown in step S502). In step S502, when the determination result is no, the control unit 110 returns to step S502; when the determination result is yes, the control unit 110 determines whether the battery 106 of the UPS is at a low voltage according to the sensing result provided by the sensing circuit 112 (as shown in step S504). When the determination result in step S504 shows that the battery 106 of the UPS is at the low voltage, the control unit 110 instructs the audio circuit 180 to select an audio file corresponding to a low battery alert sound, so that the audio circuit 180 outputs a corresponding first PWM signal PWM_1 and a corresponding second PWM signal PWM_2 (As shown in step S506), thereby causing the speaker 190 to emit the low battery alert sound, such as to emit the alert sound described in FIG. 2, or to emit a third alert sound.

On the contrary, when the determination result in step S504 shows that the battery 106 of the UPS is not at the low voltage, the control unit 110 instructs the audio circuit 180 to select an audio file corresponding to a battery mode alert sound, so that the audio circuit 180 outputs a corresponding first PWM signal PWM_1 and a corresponding second PWM signal PWM_2 (as shown in step S508), thereby causing the speaker 190 to emit the battery mode alert sound, such as to emit the alert sound described in FIG. 3, or to emit a fourth alert sound. In short, the alert sound emitted when the battery 106 is at the low voltage is different from the alert sound emitted when the battery 106 is not at the low voltage.

Figure 6:
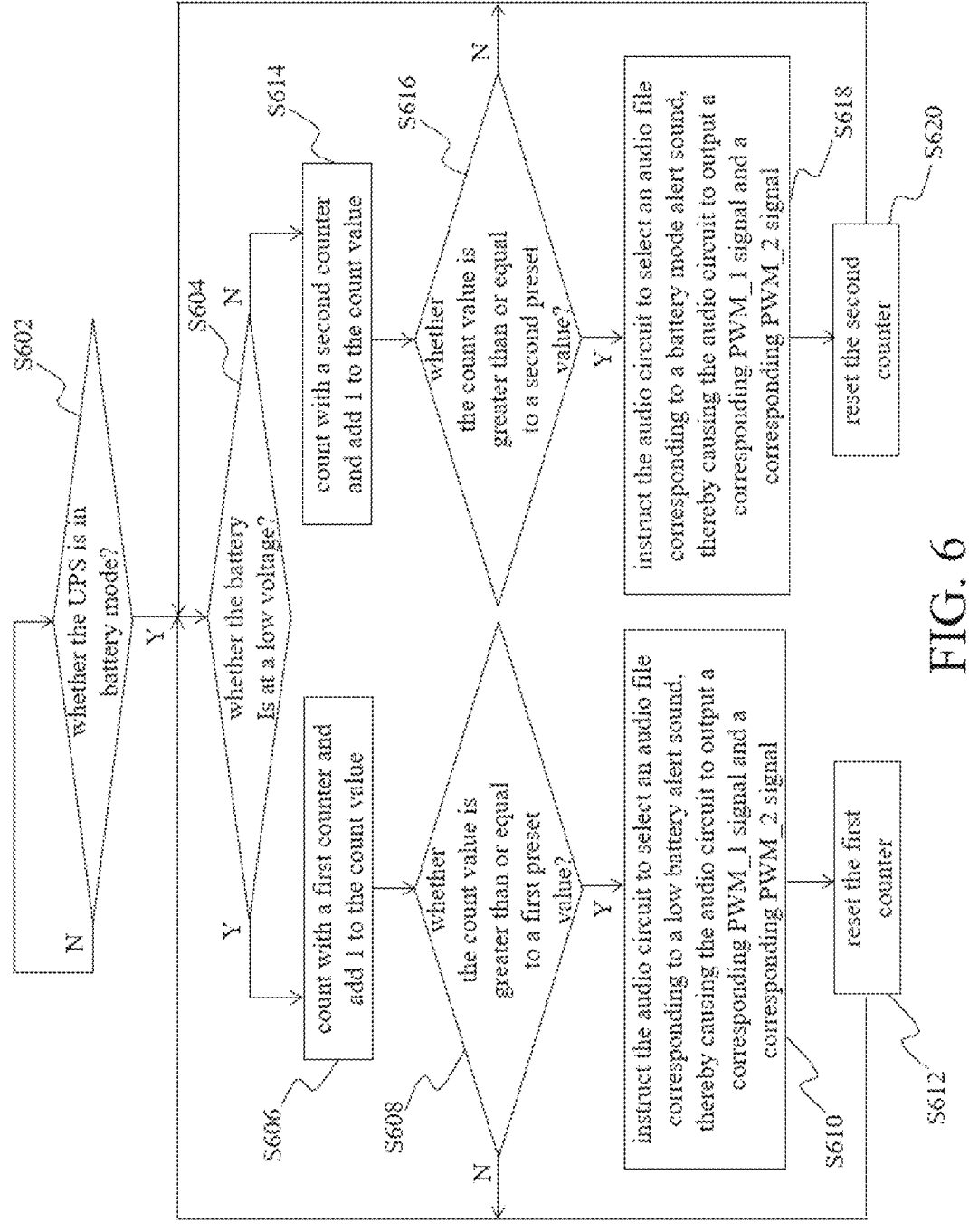
FIG. 6 shows a process for illustrating still another one of the alert sound applications of the power device 100.

FIG. 6 shows a process for illustrating still another one of the alert sound applications of the power device 100. Please refer to FIGS. 6 and 5. Compared with FIG. 5, the process shown in FIG. 6 has additional steps of counting with a first counter and adding 1 to the count value (as shown in step S606), determining whether the count value being greater than or equal to a first preset value (as shown in step S608), resetting the first counter (as shown in step S612), counting with a second counter and adding 1 to the count value (as shown in step S614), determining whether the count value being greater than or equal to a second preset value (as shown in step S616), and resetting the second counter (as shown in step S620). The first preset value is, for example, 10 seconds, and the second preset value is, for example, 30 seconds. In this way, when the determination result in step S604 shows that the battery 106 is at the low voltage, the speaker 190 emits the low battery alert sound every 10 seconds. Similarly, when the determination result in step S604 shows that the battery 106 is not at the low voltage, the speaker 190 emits the battery mode alert sound every 30 seconds. In addition, although in this embodiment, the first preset value is 10 seconds and the second preset value is 30 seconds, this is only used as an example, and is not intended to limit the present invention.

Please refer to FIG. 1 again. In this embodiment, the control unit 110 is further electrically coupled to a network through the communication interface 192, and the control unit 110 is further configured to provide a web user interface. The web user interface is configured for users to set alert sounds under different determination results. In addition, in this embodiment, the user interface 194 is also configured for users to set alert sounds under different determination results. In this embodiment, the user interface 194 comprises a touch display panel.

In addition, although in this embodiment, the sensing circuit 112 is electrically coupled to the AC power source, the output terminal 122 of the UPS and the input terminal of the DC-AC conversion circuit 104, this is not intended to limit the present invention. Those of ordinary skill in the art should know that the sensing circuit 112 may also be electrically coupled to at least one of the AC power source, the output terminal 122 of the UPS, and the input terminal of the DC-AC conversion circuit 104. It is worth mentioning that although in this embodiment, the UPS comprises the filter unit 114, the filter unit 120, the battery 106, the communication interface 192 and the user interface 194, this is not intended to limit the present invention. Those of ordinary skill in the art should know that the use of these five components can be decided according to actual design requirements. For example, the UPS may not have the battery 106 inside, but instead use an external battery 106.

It is worth mentioning that the audio circuit 180 can also provide only one of the first PWM signal PWM_1 and the second PWM signal PWM_2 to the speaker 190, so that the speaker 190 emits a corresponding alert sound accordingly. However, in this case, the input terminal of the speaker 190 that does not receive the PWM signal needs to be electrically coupled to a reference potential, such as a ground potential.

Figure 7:
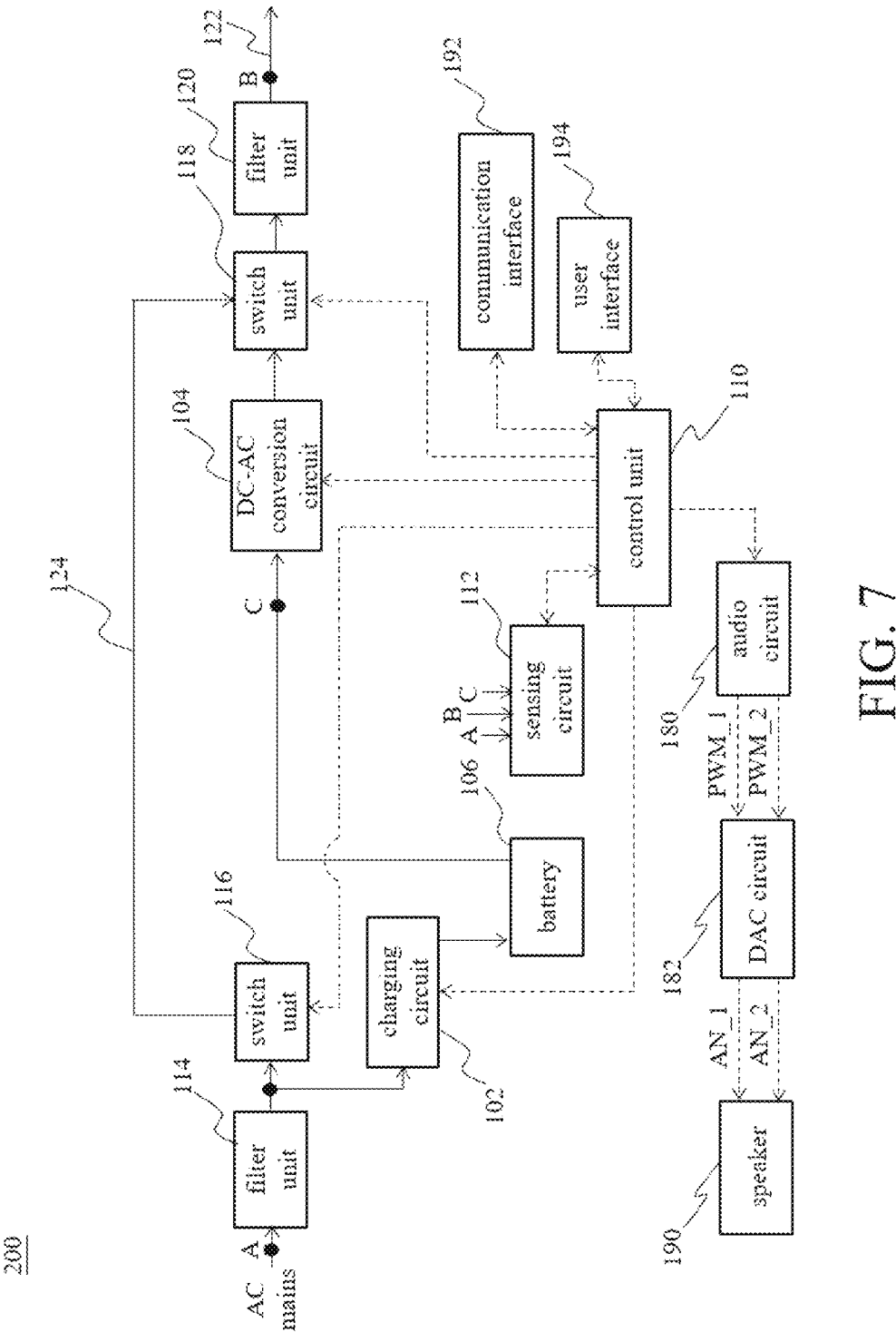
FIG. 7 illustrates a power device according to another embodiment of the present invention.

FIG. 7 illustrates a power device according to another embodiment of the present invention. As shown in FIG. 7, the power device 200 is a UPS. It can be seen from the circuit structure shown in FIG. 7 that the power device 200 is an off-line UPS. Compared with the off-line UPS shown in FIG. 1, the off-line UPS shown in FIG. 7 further comprises a DAC (digital-to-analog conversion) circuit 182. The DAC circuit 182 is electrically coupled between the audio circuit 180 and the speaker 190. The DAC circuit 182 comprises a first input terminal, a second input terminal, a first output terminal, and a second output terminal. The first input terminal and the second input terminal of the DAC circuit 182 are electrically coupled to the first output terminal and the second output terminal of the audio circuit 180, respectively, so as to receive the first PWM signal PWM_1 and the second PWM Signal PWM_2. The first output terminal and the second output terminal of the DAC circuit 182 are electrically coupled to the first input terminal and the second input terminal of the speaker 190, respectively. The DAC circuit 182 is configured to convert the first PWM signal PWM_1 and the second PWM signal PWM_2 into a first analog signal AN_1 and a second analog signal AN_2, and output the first analog signal AN_1 and the second analog signal AN_2 from the first output terminal and the second output terminal of the DAC circuit 182, respectively, thereby causing the speaker 190 to emit a corresponding alert sound.

It is worth mentioning that the audio circuit 180 can also only provide one of the first PWM signal PWM_1 and the second PWM signal PWM_2 to the DAC circuit 182, and the DAC circuit 182 is configured to convert the received PWM signal into the first analog signal AN_1 and the second analog signal AN_2, thereby causing the speaker 190 to emit a corresponding alert sound. In addition, another approach is that the audio circuit 180 only provides one of the first PWM signal PWM_1 and the second PWM signal PWM_2 to the DAC circuit 182, and the DAC circuit 182 is configured to convert the received PWM signal into one of the first analog signal AN_1 and the second analog signal AN_2, and then provide the obtained analog signal to the speaker 190, thereby causing the speaker 190 to emit a corresponding alert sound. Certainly, in this approach, the input terminal of the speaker 190 that does not receive any analog signal needs to be electrically coupled to the reference potential.

According to the above teachings, those of ordinary skill in the art should know that the above concept of alert sounds can also be applied to other UPSs with different architectures. Certainly, the above-mentioned concept of alert sounds can also be applied to other different types of power devices, such as power distribution units (PDU) and automatic transfer switches (ATS). Please see the instructions below.

Figure 8:
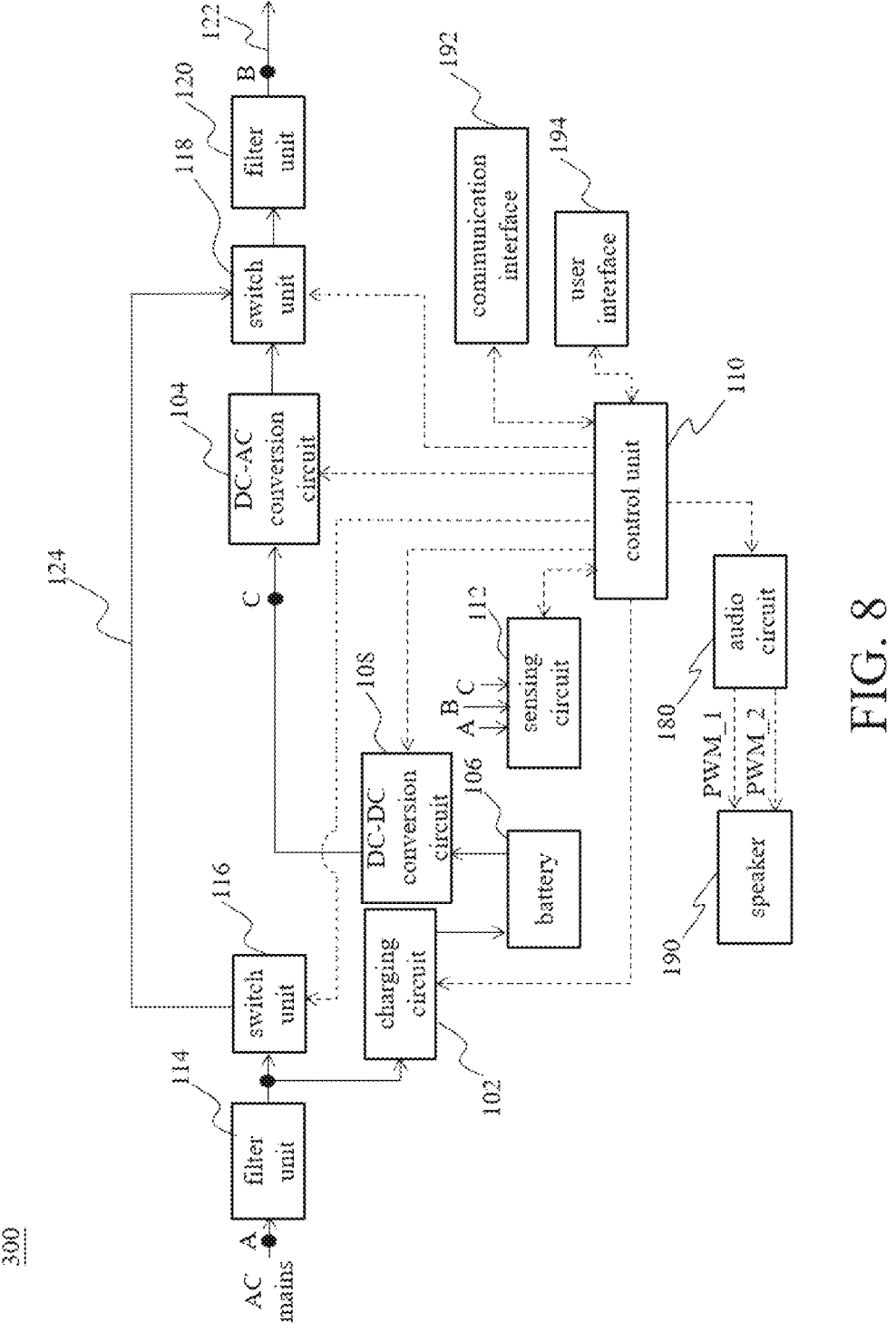
FIG. 8 illustrates a power device according to still another embodiment of the present invention.

FIG. 8 illustrates a power device according to still another embodiment of the present invention. As shown in FIG. 8, the power device 300 is a UPS. It can be seen from the circuit structure shown in FIG. 8 that the power device 200 is an off-line UPS. Compared with the off-line UPS shown in FIG. 1, the off-line UPS shown in FIG. 8 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 9:
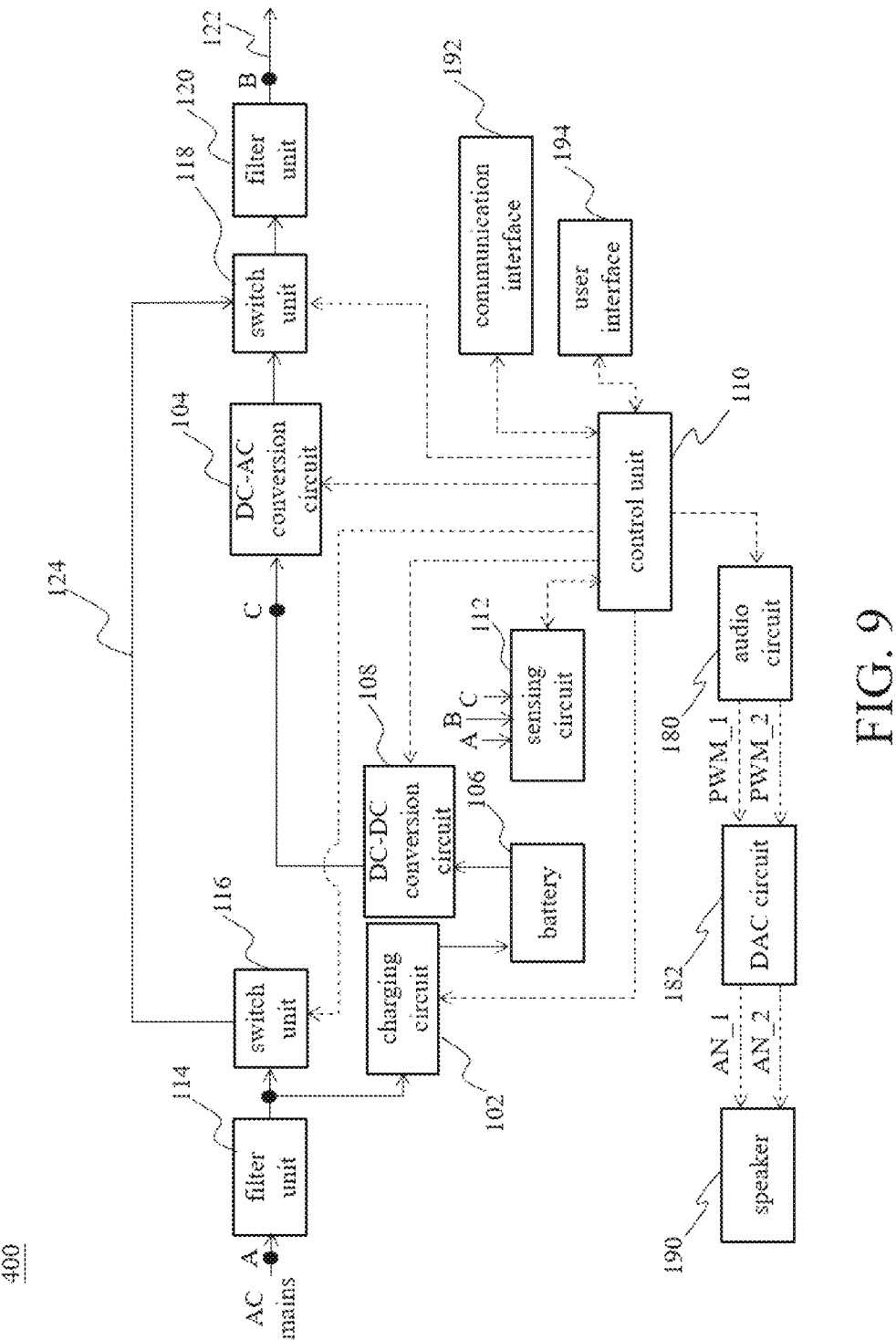
FIG. 9 illustrates a power device according to still another embodiment of the present invention.

FIG. 9 illustrates a power device according to still another embodiment of the present invention. As shown in FIG. 9, the power device 400 is a UPS. It can be seen from the circuit structure shown in FIG. 9 that the power device 400 is an off-line UPS. Compared with the off-line UPS shown in FIG. 7, the off-line UPS shown in FIG. 9 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 10:
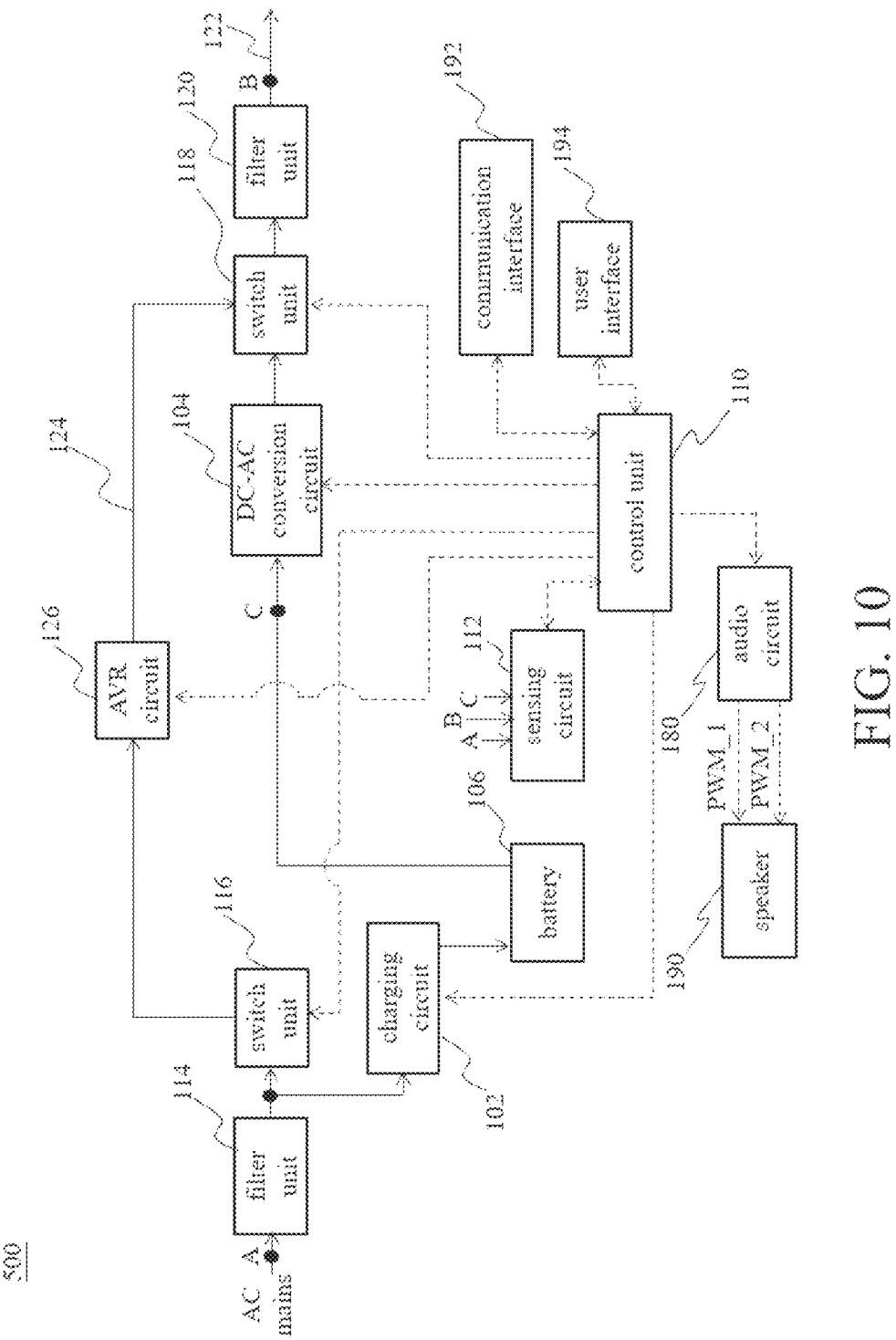
FIG. 10 illustrates a power device according to still another embodiment of the present invention.

FIG. 10 illustrates a power device according to still another embodiment of the present invention. As shown in FIG. 10, the power device 500 is a UPS. It can be seen from the circuit structure shown in FIG. 10 that the power device 500 is a line-interactive UPS. Compared with the off-line UPS shown in FIG. 1, the line-interactive UPS shown in FIG. 10 further comprises an AVR (automatic voltage regulation) circuit 126. The AVR circuit 126 is configured on the bypass path 124, and is electrically coupled to the control unit 110 to be controlled by the control unit 110.

Figure 11:
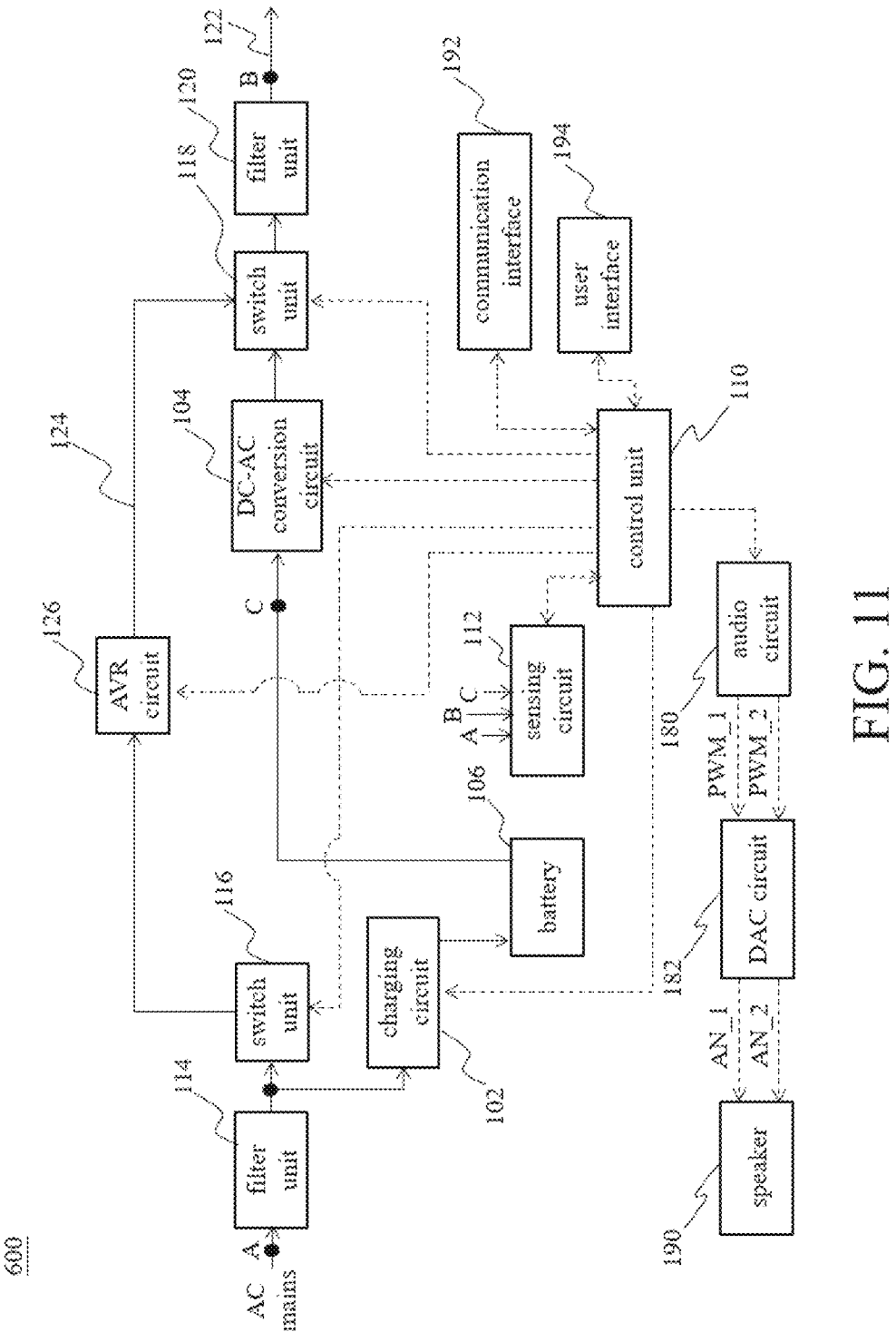
FIG. 11 illustrates a power device according to still another embodiment of the present invention.

FIG. 11 illustrates a power device according to still another embodiment of the present invention. As shown in FIG. 11, the power device 600 is a UPS. It can be seen from the circuit structure shown in FIG. 11 that the power device 600 is a line-interactive UPS. Compared with the off-line UPS shown in FIG. 7, the line-interactive UPS shown in FIG. 11 further comprises an AVR circuit 126. The AVR circuit 126 is configured on the bypass path 124, and is electrically coupled to the control unit 110 to be controlled by the control unit 110.

Figure 12:
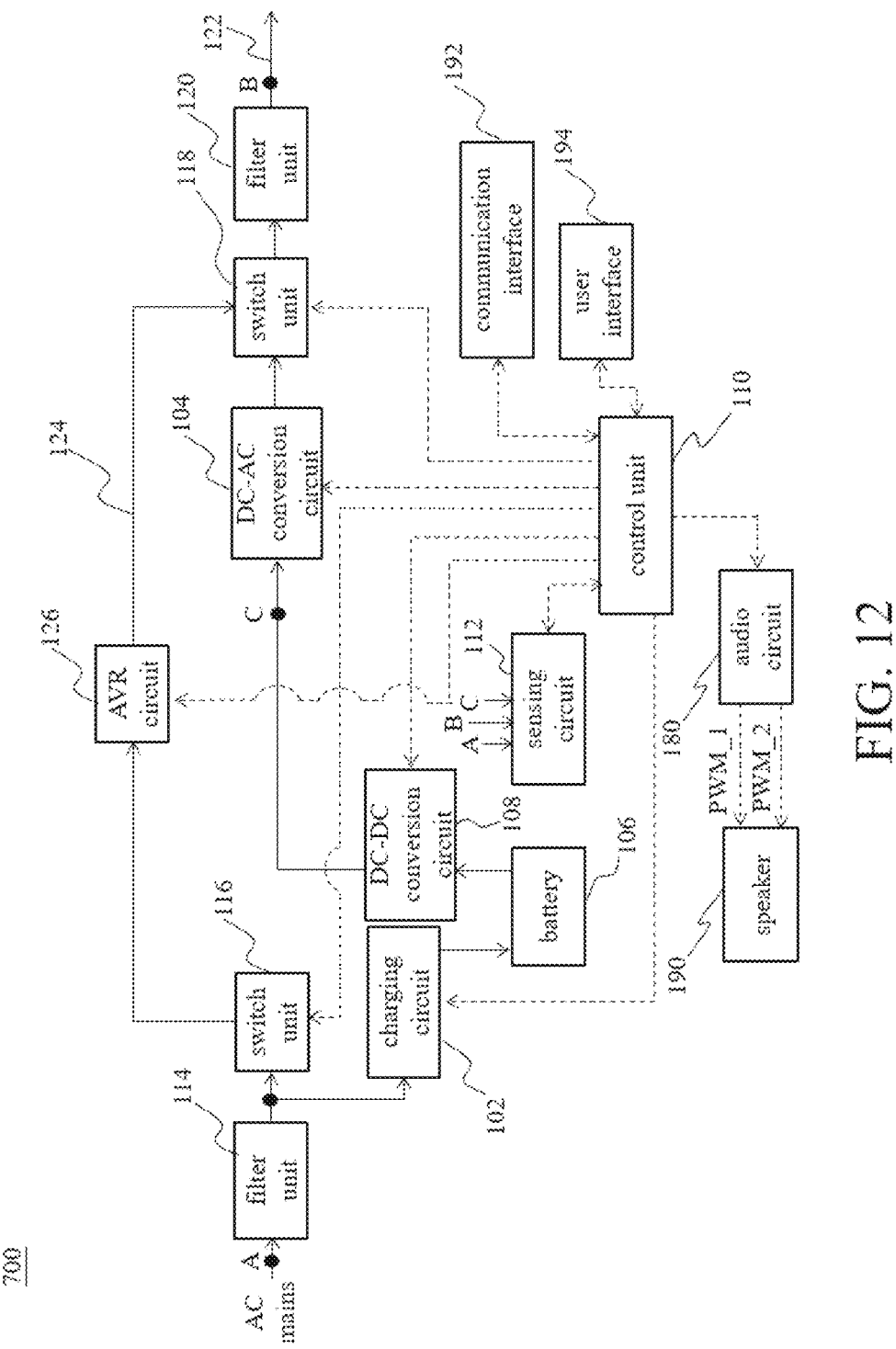
FIG. 12 illustrates a power device according to still another embodiment of the present invention.

FIG. 12 illustrates a power device according to still another embodiment of the present invention. As shown in FIG. 12, the power device 700 is a UPS. It can be seen from the circuit structure shown in FIG. 12 that the power device 700 is a line-interactive UPS. Compared with the line-interactive UPS shown in FIG. 10, the line-interactive UPS shown in FIG. 12 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 13:
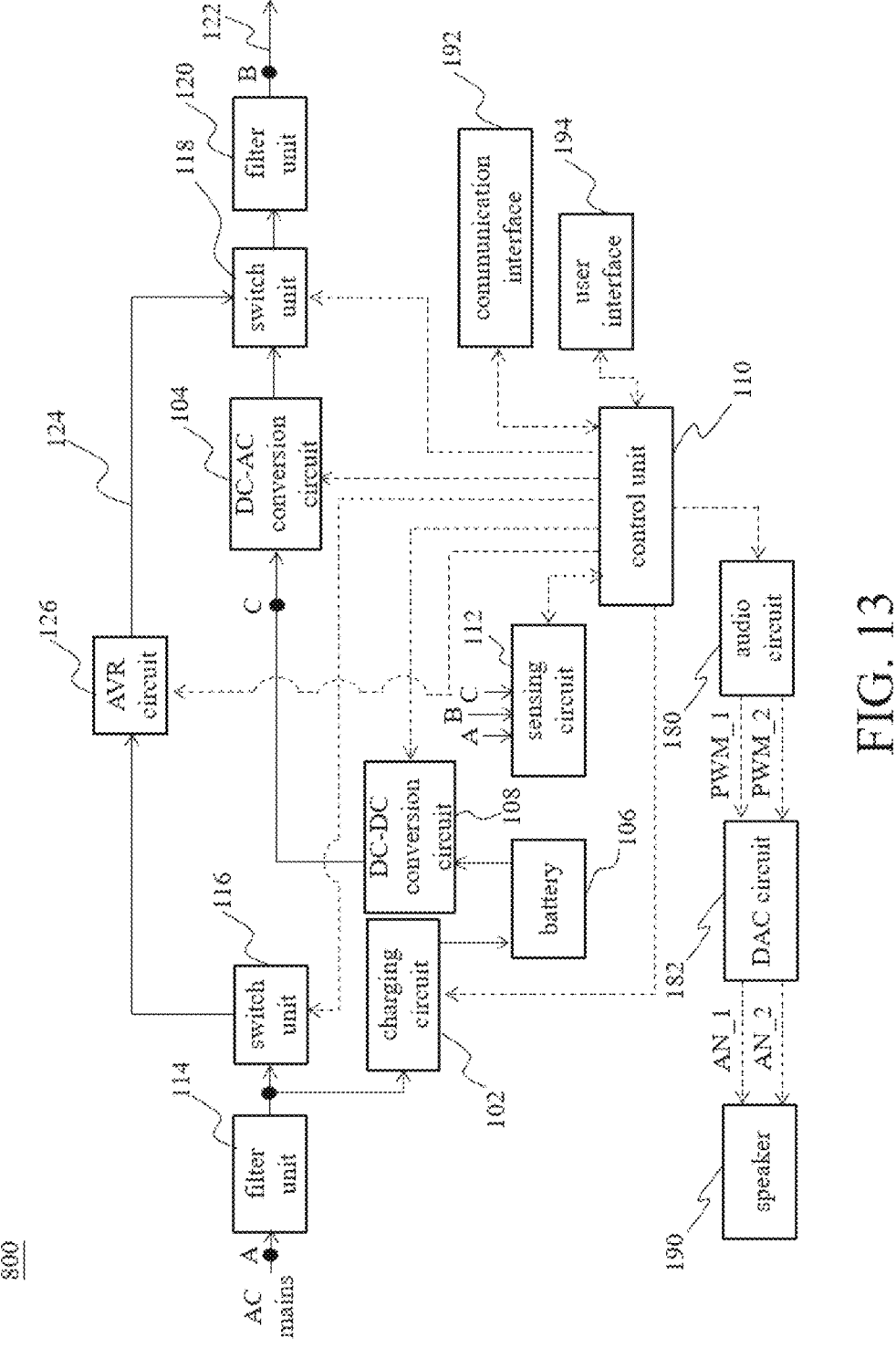
FIG. 13 illustrates a power device according to still another embodiment of the present invention.

FIG. 13 illustrates a power device according to still another embodiment of the present invention. As shown in FIG. 13, the power device 800 is a UPS. It can be seen from the circuit structure shown in FIG. 13 that the power device 800 is a line-interactive UPS. Compared with the line-interactive UPS shown in FIG. 11, the line-interactive UPS shown in FIG. 13 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 14:
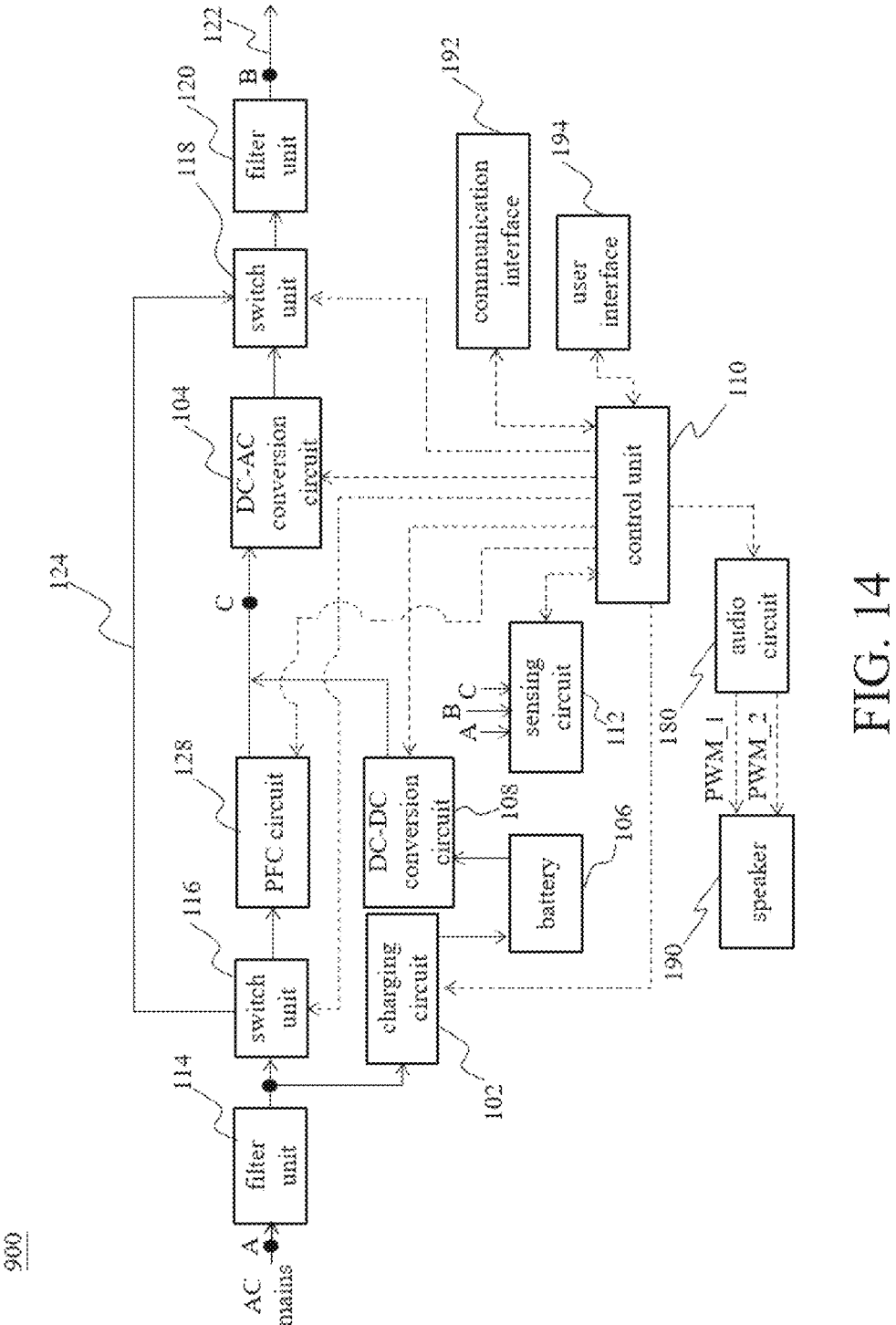
FIG. 14 illustrates a power device according to still another embodiment of the present invention.

FIG. 14 illustrates a power device according to still another embodiment of the present invention. As shown in FIG. 14, the power device 900 is a UPS. It can be seen from the circuit structure shown in FIG. 14 that the power device 900 is an on-line UPS. Compared with the off-line UPS shown in FIG. 8, the on-line UPS shown in FIG. 14 further comprises a PFC (power factor correction) circuit 128. The PFC circuit 128 is electrically coupled between the switch unit 116 and the input terminal of the DC-AC conversion circuit 104, and is electrically coupled to the control unit 110 to be controlled by the control unit 110. In addition, in this embodiment, the control unit 110 can control the operation of the switch unit 116 to determine whether to electrically couple the filter unit 114 to the bypass path 124, or to electrically couple the filter unit 114 to the input terminal of the PFC circuit 128.

Figure 15:
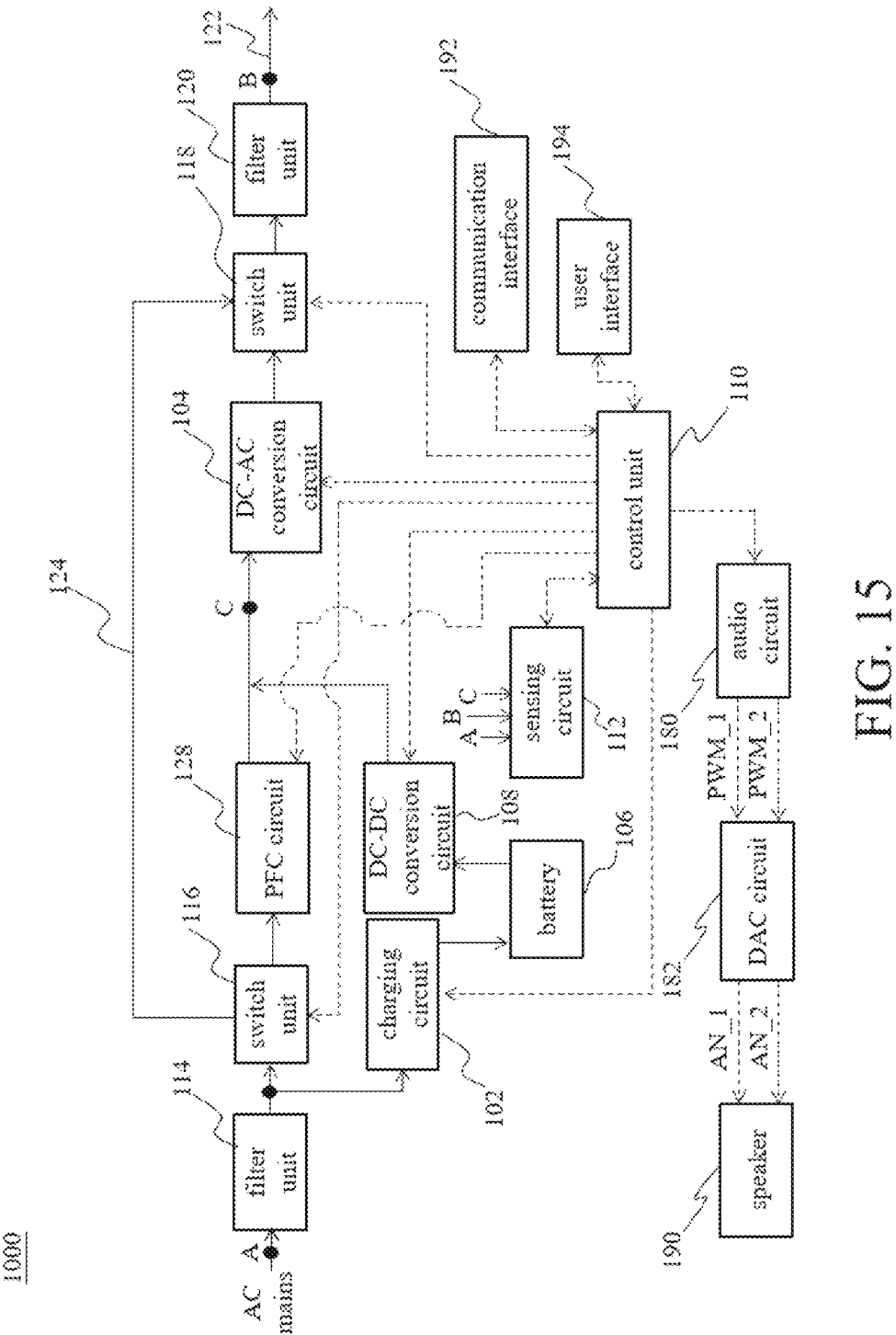
FIG. 15 illustrates a power device according to still another embodiment of the present invention.

FIG. 15 illustrates a power device according to still another embodiment of the present invention. As shown in FIG. 15, the power device 1000 is a UPS. It can be seen from the circuit structure shown in FIG. 15 that the power device 1000 is an on-line UPS. Compared with the off-line UPS shown in FIG. 9, the on-line UPS shown in FIG. 15 further comprises a PFC circuit 128. The PFC circuit 128 is electrically coupled between the switch unit 116 and the input terminal of the DC-AC conversion circuit 104, and is electrically coupled to the control unit 110 to be controlled by the control unit 110. In addition, in this embodiment, the control unit 110 can control the operation of the switch unit 116 to determine whether to electrically couple the filter unit 114 to the bypass path 124, or to electrically couple the filter unit 114 to the input terminal of the PFC circuit 128.

Figure 16:
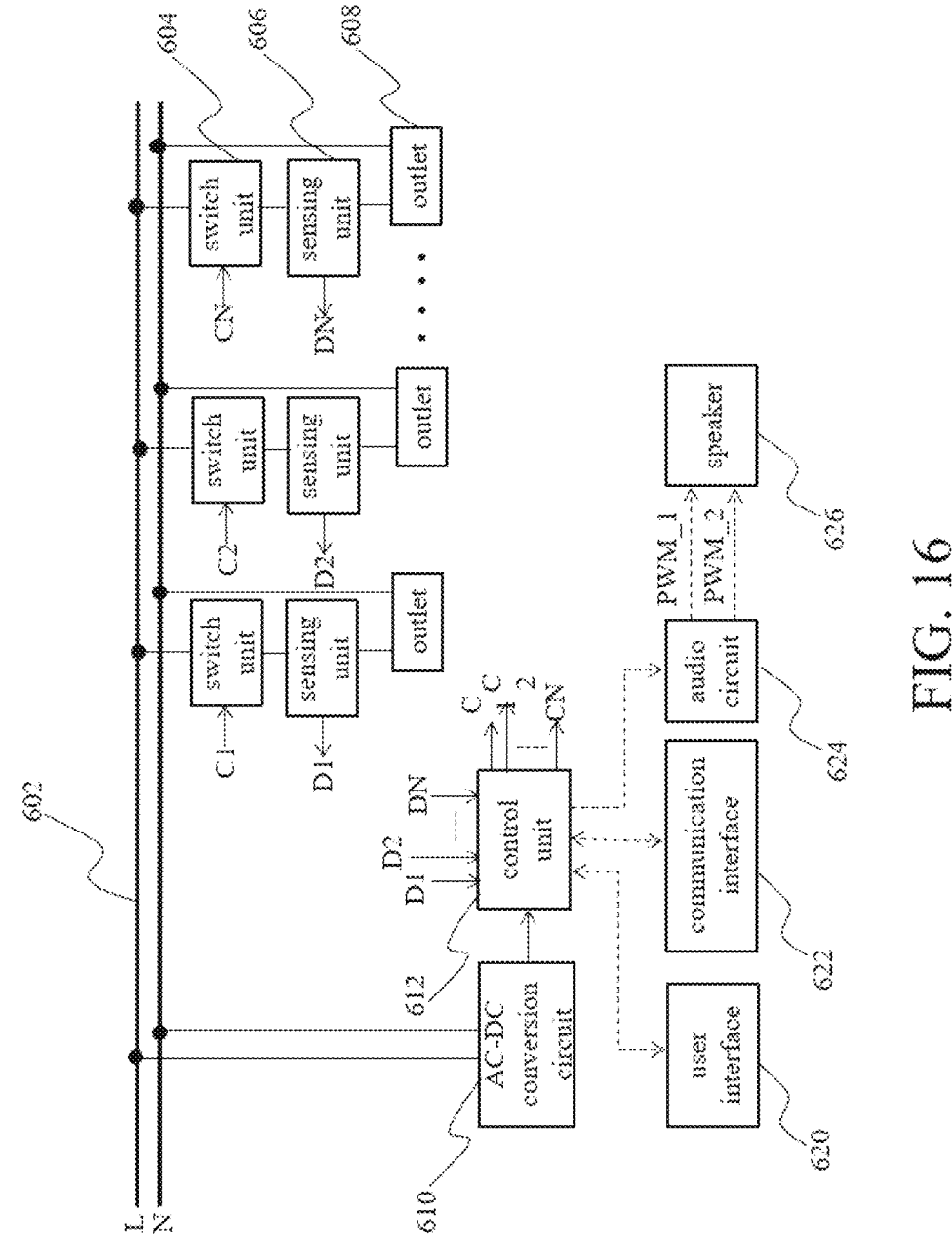
FIG. 16 illustrates a power device according to still another embodiment of the present invention.

FIG. 16 illustrates a power device according to still another embodiment of the present invention. As shown in FIG. 16, the power device 1100 is a PDU. The power device 1000 comprises two conductors (as shown by the mark 602), a plurality of switch units (as shown by the mark 604), a plurality of sensing units (as shown by the mark 606), a plurality of outlets (as shown by the mark 608), AC-DC conversion circuit 610, control unit 612, user interface 620, communication interface 622, audio circuit 624 and speaker

626. As shown in FIG. 16, the two conductors 602 are electrically coupled to the live wire (as shown by the mark L) and the neutral wire (as shown by the mark N) of the AC power source, respectively. Each switch unit 604 is electrically coupled to one of the two conductors 602. Each sensing unit 606 is electrically coupled to one of the switch units 604. Each outlet 608 is electrically coupled to one of the sensing units 606 and to the other of the two conductors 602. The AC-DC conversion circuit 610 is electrically coupled to the two conductors, and supplies operation voltage to the control unit 612.

In addition, the switch units 604, the user interface 620, the communication interface 622 and the audio circuit 624 are electrically coupled to the control unit 612 to be controlled by the control unit 612. Marks C1 to CN represent the control signals for controlling the switch units 604, respectively, where N is a natural number. In addition, the sensing units 606 are electrically coupled to the control unit 612 to provide sensing signals D1 to DN to the control unit 612, respectively. In this embodiment, the audio circuit 624 also provides the first PWM signal PWM_1 and the second PWM signal PWM_2 to the speaker 626. Therefore, the speaker 626 can emit different alert sounds to make users to instantly obtain and identify the current state and behavior of the PDU. For example, the speaker 626 can emit different alert sounds to indicate whether the PDU is in on state or in off state. Since the functions and operations of the control unit 612, the audio circuit 624 and the speaker 626 can refer to the functions and operations of the control unit 110, the audio circuit 180 and the speaker 190 in FIG. 1, these will not be repeated here.

In addition, in this embodiment, the control unit 612 is further electrically coupled to a network through the communication interface 622, and the control unit 612 is further configured to provide a web user interface. The web user interface is configured for users to set alert sounds under different determination results. In addition, in this embodiment, the user interface 620 is also configured for users to set alert sounds under different determination results. In this embodiment, the user interface 620 comprises a touch display panel. It is worth mentioning that the audio circuit 624 may also provide only one of the first PWM signal PWM_1 and the second PWM signal PWM_2 to the speaker 626, thereby causing the speaker 190 to emit a corresponding alert sound. However, in this case, the input terminal of the speaker 626 that does not receive the PWM signal needs to be electrically coupled to the reference potential.

Figure 17:
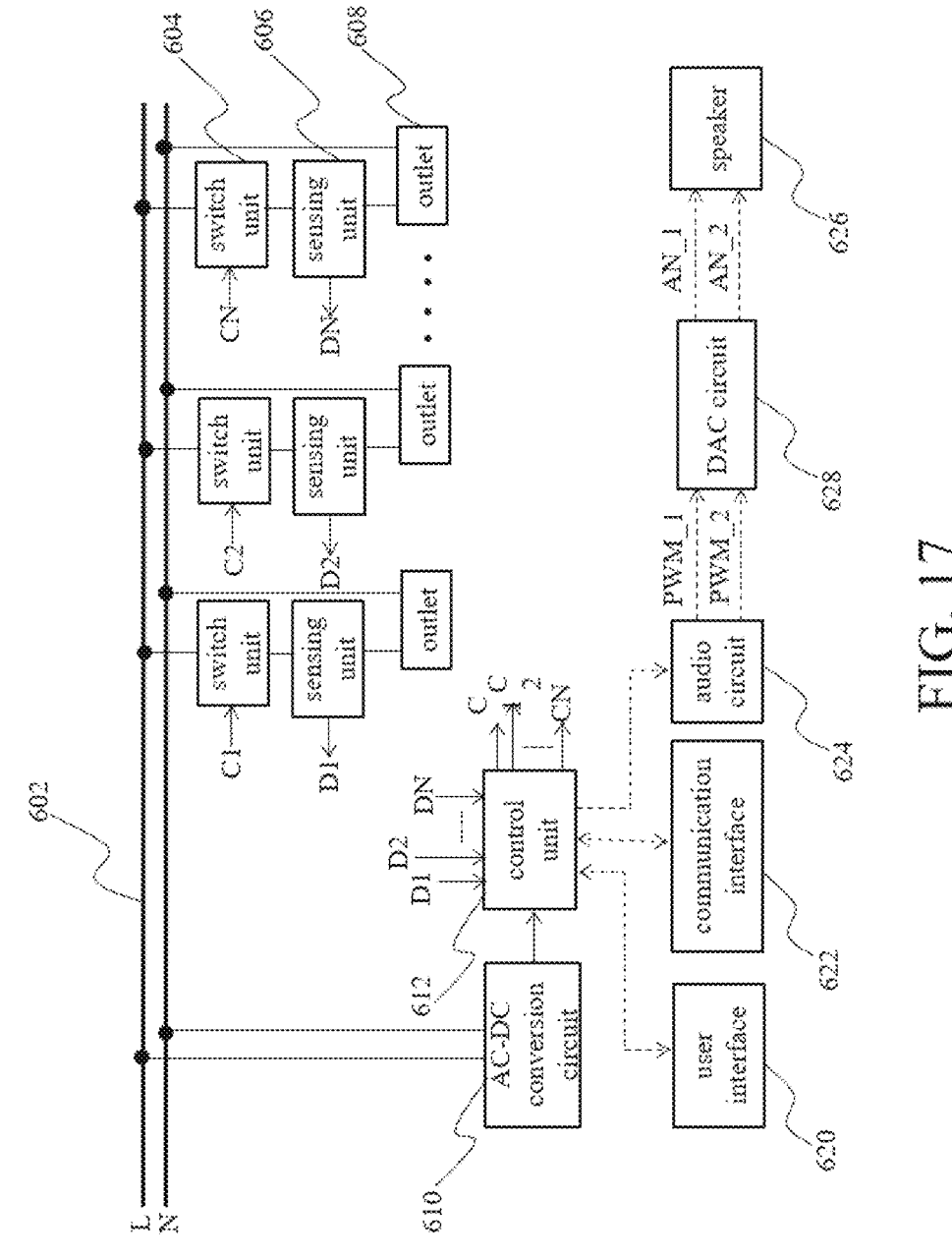
FIG. 17 illustrates a power device according to still another embodiment of the present invention.

FIG. 17 illustrates a power device according to still another embodiment of the present invention. As shown in FIG. 17, the power device 1200 is a PDU. Compared with the PDU shown in FIG. 16, the PDU shown in FIG. 17 further comprises a DAC circuit 628. The DAC circuit 628 is electrically coupled between the audio circuit 624 and the speaker 626. The DAC circuit 628 comprises a first input terminal, a second input terminal, a first output terminal, and a second output terminal. The first input terminal and the second input terminal of the DAC circuit 628 are electrically coupled to the first output terminal and the second output terminal of the audio circuit 624, respectively, so as to receive the first PWM signal PWM_1 and the second PWM Signal PWM_2. The first output terminal and the second output terminal of the DAC circuit 628 are electrically coupled to the first input terminal and the second input terminal of the speaker 626, respectively. The DAC circuit 628 is configured to convert the first PWM signal PWM_1 and the second PWM signal PWM_2 into a first analog signal AN_1 and a second analog signal AN_2, and output the first analog signal AN_1 and the second analog signal AN_2 from the first output terminal and the second output terminal of the DAC circuit 628, respectively, thereby causing the speaker 190 to emit a corresponding alert sound.

It is worth mentioning that the audio circuit 628 can also only provide one of the first PWM signal PWM_1 and the second PWM signal PWM_2 to the DAC circuit 628, and the DAC circuit 628 is configured to convert the received PWM signal into the first analog signal AN_1 and the second analog signal AN_2, thereby causing the speaker 190 to emit a corresponding alert sound. In addition, another approach is that the audio circuit 180 only provides one of the first PWM signal PWM_1 and the second PWM signal PWM_2 to the DAC circuit 628, and the DAC circuit 628 is configured to convert the received PWM signal into one of the first analog signal AN_1 and the second analog signal AN_2, and then provide the obtained analog signal to the speaker 626, thereby causing the speaker 626 to emit a corresponding alert sound. Certainly, in this approach, the input terminal of the speaker 626 that does not receive an analog signal needs to be electrically coupled to the reference potential.

Figure 18:
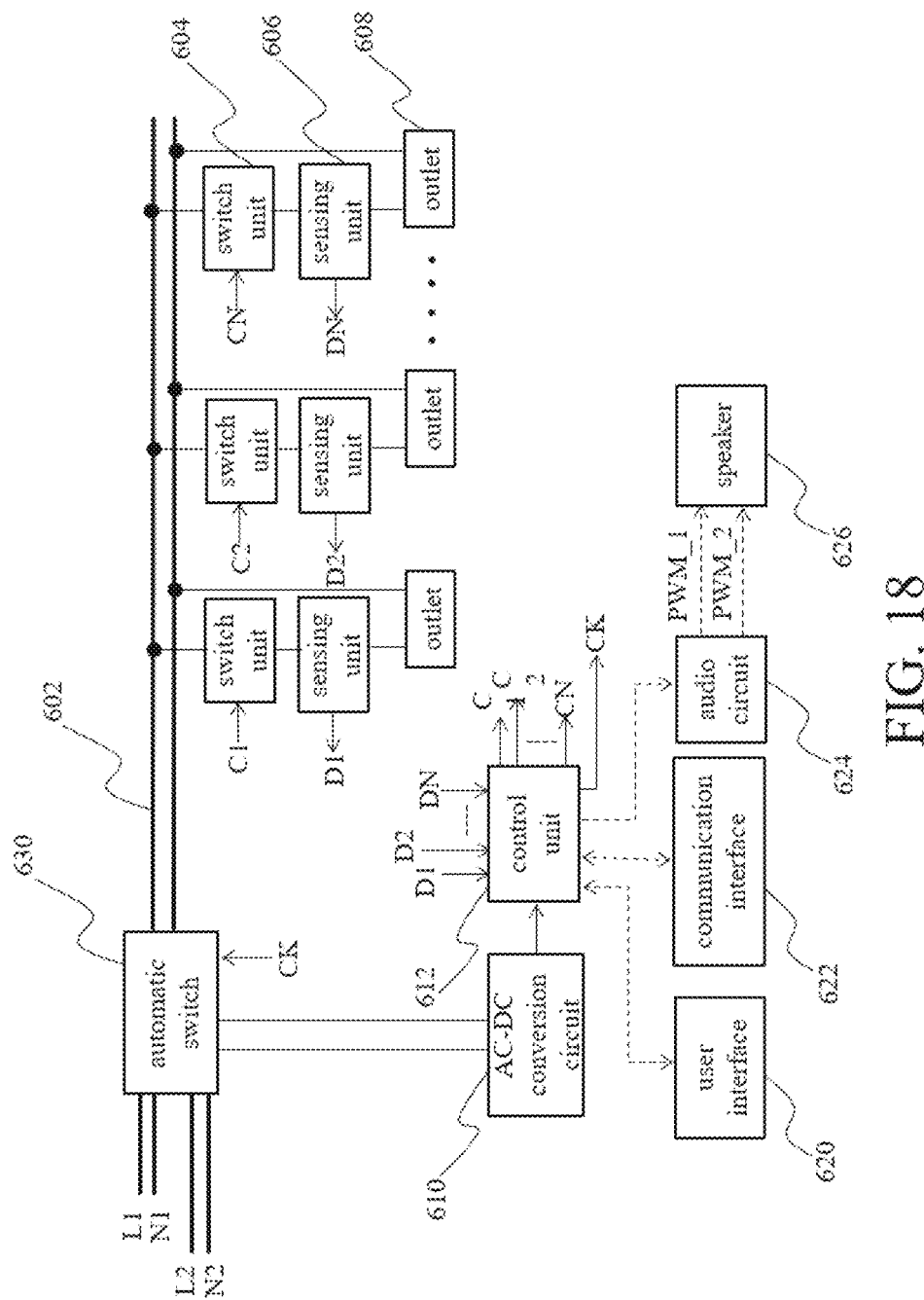
FIG. 18 illustrates a power device according to still another embodiment of the present invention.

FIG. 18 illustrates a power device according to still another embodiment of the present invention. As shown in FIG. 18, the power device 1300 is an ATS. Compared with the PDU shown in FIG. 16, the ATS shown in FIG. 18 further comprises an automatic switch 630. In addition to being electrically coupled to the two conductors 602, the automatic switch 630 is also electrically coupled to two AC power sources. The live and neutral wires of one AC power source are marked by L1 and N1, respectively, while the live and neutral wires of the other AC power source are marked by L2 and N2, respectively. In addition, the control unit 612 also uses a control signal CK to control the operation of the automatic switch 630, so as to control the automatic switch 630 to select one of the AC power sources to be electrically coupled to the two conductors 602.

Figure 19:
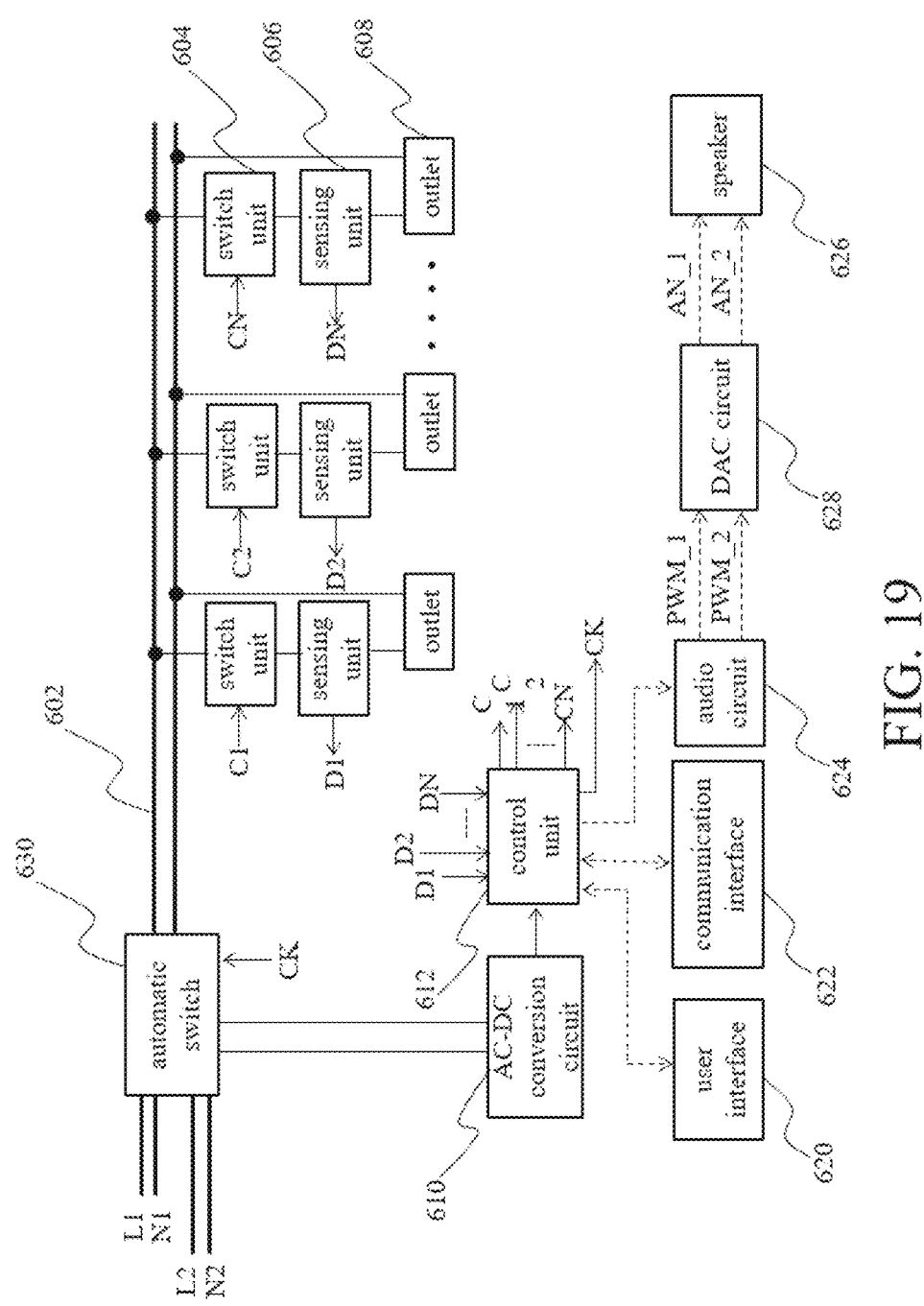
FIG. 19 illustrates a power device according to still another embodiment of the present invention.

FIG. 19 illustrates a power device according to still another embodiment of the present invention. As shown in FIG. 19, the power device 1400 is an ATS. Compared with the PDU shown in FIG. 17, the ATS shown in FIG. 19 further comprises an automatic switch 630. In addition to being electrically coupled to the two conductors 602, the automatic switch 630 is also electrically coupled to two AC power sources. The live and neutral wires of one AC power source are marked by L1 and N1, respectively, while the live and neutral wires of the other AC power source are marked by L2 and N2 respectively. In addition, the control unit 612 also uses the control signal CK to control the operation of the automatic switch 630, so as to control the automatic switch 630 to select one of the AC power sources to be electrically coupled to the two conductors 602.

Figure 20:
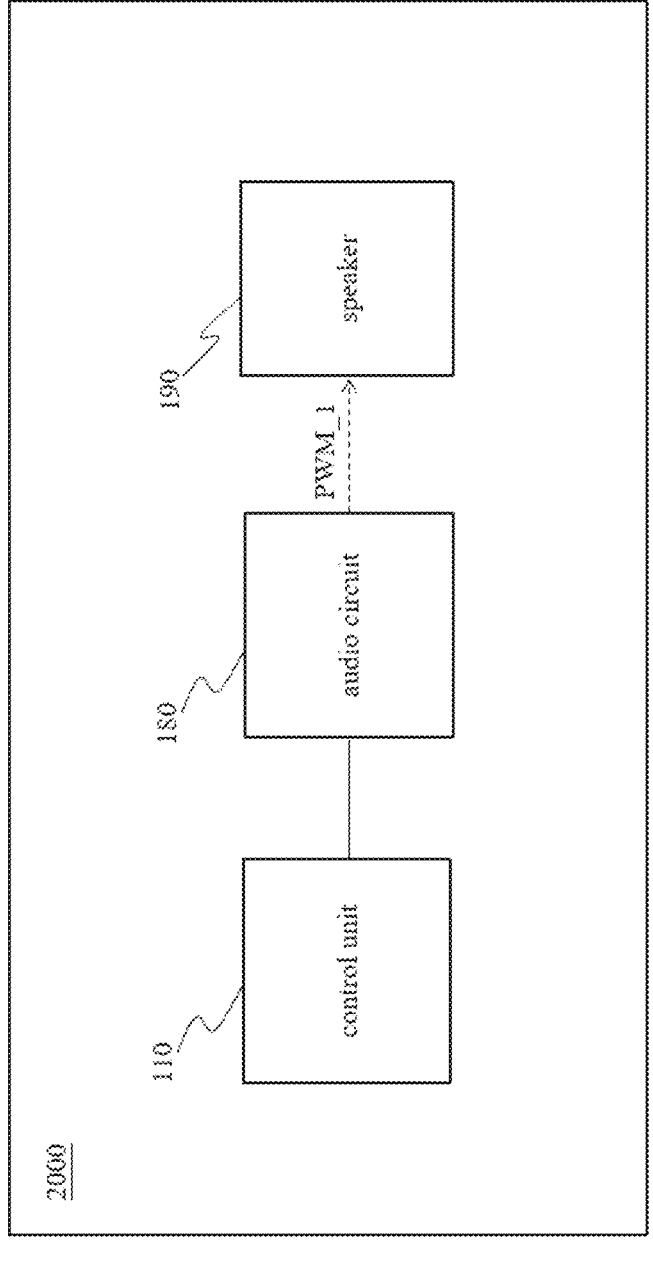
FIG. 20 shows a main block diagram of the power device of the present invention.

According to the description of the above embodiments, the main block diagram of the power device of the present invention can be summarized, as shown in FIG. 20. Referring to FIG. 20, the power device 2000 mainly comprises a control unit 110, an audio circuit 180 and a speaker 190. In summary, since the audio circuit 180 stores a plurality of audio files corresponding to different alert sounds, each alert sound comprises at least two pitches, and the audio circuit 180 can generate a corresponding PWM signal according to the selected audio file, thereby causing the speaker 190 to emit different alert sounds. In addition, in the above embodiments, the control unit and the audio circuit can also be integrated into an integrated circuit, and are not limited to being implemented by two separate components.

The above-described embodiments are only for illustrating the technical ideas and characteristics of the present invention. Their purpose is to enable those of ordinary skill in the art to understand the content of the present invention and implement it accordingly. They cannot be used to limit the patent scope of the present invention. Any equivalent changes or modifications made in accordance with the spirit disclosed in the present invention should still be covered by the patent scope of the present invention.

What is claimed is:

1. A power device, wherein the power device is a UPS, and the power device comprises:

a speaker, comprising a first input terminal, and being configured to emit sound according to the signal received by the first input terminal;

an audio circuit, comprising a first output terminal, the first output terminal being electrically coupled to the first input terminal, the audio circuit storing a plurality of audio files, each audio file corresponding to an alert sound, each alert sound comprising at least two pitches, and each pitch corresponding to a PWM frequency, the audio circuit being also configured to select one of the audio files according to a control command, generate a first PWM signal according to the selected audio file, and output the first PWM signal from the first output terminal;

a first switch unit, electrically coupled to an AC power source and a first terminal of a bypass path;

a second switch unit, electrically coupled to an output terminal of the UPS and a second terminal of the bypass path;

a charging circuit, electrically coupling the AC power source and a battery;

a DC-AC conversion circuit, electrically coupled between the battery and the second switch unit, a sensing circuit, electrically coupled to at least one of the AC power source, the output terminal of the UPS and the input terminal of the DC-AC conversion circuit to obtain a sensing result; and a control unit, electrically coupled to the audio circuit, the sensing circuit, the first switch unit, the second switch unit, the charging circuit and the DC-AC conversion circuit for controlling their operation, and being configured to obtain a determination result according to the sensing result, and generate a corresponding control command according to the determination result, wherein the determination result shows whether the battery of the UPS is at a low voltage, and the alert sound emitted when the battery is at the low voltage is different from the alert sound emitted when the battery is not at the low voltage.

2. The power device as claimed in claim 1, wherein the speaker further comprises a second input terminal, and is further configured to emit sound according to the signals received by the first input terminal and the second input terminal, the audio circuit further comprises a second output terminal, the second output terminal is electrically coupled to the second input terminal, the audio circuit is further configured to generate a second PWM signal according to the audio file, and output the second PWM signal from the second output terminal, wherein the timing of the second PWM signal is different from the timing of the first PWM signal.

3. The power device as claimed in claim 2, further comprising a DAC circuit electrically coupled between the audio circuit and the speaker, the DAC circuit comprising a third input terminal, a fourth input terminal, a third output terminal, and a fourth output terminal, the third input terminal, the fourth input terminal, the third output terminal and the fourth output terminal being electrically coupled to the first output terminal, the second output terminal, the first input terminal and the second input terminal, respectively, the DAC circuit being configured to convert the first PWM signal and the second PWM signal into a first analog signal and a second analog signal, and output the first analog signal and the second analog signal from the third output terminal and the fourth output terminal, respectively.

4. The power device as claimed in claim 1, further comprising a DAC circuit electrically coupled between the audio circuit and the speaker, the DAC circuit comprising a second input terminal and a second output terminal, the second input terminal being electrically coupled to the first output terminal, the second output terminal being electrically coupled to the first input terminal, the DAC circuit being configured to convert the first PWM signal into a first analog signal, and output the first analog signal from the second output terminal.

5. The power device as claimed in claim 4, wherein the speaker further comprises a third input terminal, and is further configured to emit sound according to the signals received by the first input terminal and the third input terminal, the DAC circuit further comprises a third output terminal, the third output terminal is electrically coupled to the third input terminal, the DAC circuit is further configured to convert the first PWM signal into the first analog signal and a second analog signal, and output the first analog signal and the second analog signal from the second output terminal and the third output terminal, respectively.

6. The power device as claimed in claim 1, wherein the control unit and the audio circuit are further integrated into an integrated circuit.

7. The power device as claimed in claim 1, wherein the control unit is further configured to provide a web user interface, and the web user interface is configured for a user to set alert sounds under different determination results.

8. The power device as claimed in claim 1, further comprising a user interface electrically coupled to the control unit, wherein the user interface is configured for a user to set alert sounds under different determination results.

9. The power device as claimed in claim 8, wherein the user interface comprises a touch display panel.

10. The power device as claimed in claim 1, further comprising a DC-DC conversion circuit electrically coupled between the battery and the input terminal of the DC-AC conversion circuit.

11. The power device as claimed in claim 10, further comprising a PFC circuit electrically coupled between the first switch unit and the input terminal of the DC-AC conversion circuit.

12. The power device as claimed in claim 1, further comprising an automatic voltage regulation circuit configured on the bypass path.

13. A power device, wherein the power device is a PDU, and the power device comprises:

a speaker, comprising a first input terminal, and being configured to emit sound according to the signal received by the first input terminal;

an audio circuit, comprising a first output terminal, the first output terminal being electrically coupled to the first input terminal, the audio circuit storing a plurality of audio files, each audio file corresponding to an alert sound, each alert sound comprising at least two pitches, and each pitch corresponding to a PWM frequency, the audio circuit being also configured to select one of the audio files according to a control command, generate a first PWM signal according to the selected audio file, and output the first PWM signal from the first output terminal;

two conductors;

a plurality of switch units, each switch unit being electrically coupled to one of the two conductors;

a plurality of sensing units, each sensing unit being electrically coupled to one of the switch units;

a plurality of outlets, each outlet being electrically coupled to one of the sensing units and to the other of the two conductors;

an AC-DC conversion circuit, electrically coupled to the two conductors; and a control unit, electrically coupled to the audio circuit, the switch units, the sensing units and the AC-DC conversion circuit, and being configured to generate a corresponding control command according to a determination result, wherein the determination result shows whether the PDU is in an on state, and the alert sound corresponding to the PDU in the on state is different from the alert sound corresponding to the PDU in an off state.

14. The power device as claimed in claim 13, wherein the control unit is further configured to provide a web user interface, and the web user interface is configured for a user to set alert sounds under different determination results.

15. The power device as claimed in claim 13, further comprising a user interface electrically coupled to the control unit, wherein the user interface is configured for a user to set alert sounds under different determination results.

16. The power device as claimed in claim 15, wherein the user interface comprises a touch display panel.

17. A power device, wherein the power device is an ATS, and the power device comprises:

a speaker, comprising a first input terminal, and being configured to emit sound according to the signal received by the first input terminal;

an audio circuit, comprising a first output terminal, the first output terminal being electrically coupled to the first input terminal, the audio circuit storing a plurality of audio files, each audio file corresponding to an alert sound, each alert sound comprising at least two pitches, and each pitch corresponding to a PWM frequency, the audio circuit being also configured to select one of the audio files according to a control command, generate a first PWM signal according to the selected audio file, and output the first PWM signal from the first output terminal;

an automatic switch;

two conductors, one terminal of each conductor being electrically coupled to the automatic switch;

a plurality of switch units, each switch unit being electrically coupled to one of the two conductors;

a plurality of sensing units, each sensing unit being electrically coupled to one of the switch units;

a plurality of outlets, each outlet being electrically coupled to one of the sensing units and to the other of the two conductors;

an AC-DC conversion circuit, electrically coupled to the automatic switch; and a control unit, electrically coupled to the audio circuit, the automatic switch, the switch units, the sensing units and the AC-DC conversion circuit, and being configured to generate a corresponding control command according to a determination result, wherein the determination result shows whether the ATS is in an on state, and the alert sound corresponding to the ATS in the on state is different from the alert sound corresponding to the ATS in an off state.

18. The power device as claimed in claim 17, wherein the control unit is further configured to provide a web user interface, and the web user interface is configured for a user to set alert sounds under different determination results.

19. The power device as claimed in claim 17, further comprising a user interface electrically coupled to the control unit, wherein the user interface is configured for a user to set alert sounds under different determination results.

20. The power device as claimed in claim 19, wherein the user interface comprises a touch display panel.

21. A power device, wherein the power device is a UPS, and the power device comprises:

a speaker, comprising a first input terminal, and being configured to emit sound according to the signal received by the first input terminal;

an audio circuit, comprising a first output terminal, the first output terminal being electrically coupled to the first input terminal, the audio circuit storing a plurality of audio files, each audio file corresponding to an alert sound, each alert sound comprising at least two pitches, and each pitch corresponding to a PWM frequency, the audio circuit being also configured to select one of the audio files according to a control command, generate a first PWM signal according to the selected audio file, and output the first PWM signal from the first output terminal;

a first switch unit, electrically coupled to an AC power source and a first terminal of a bypass path;

a second switch unit, electrically coupled to an output terminal of the UPS and a second terminal of the bypass path;

a charging circuit, electrically coupling the AC power source and a battery;

a DC-AC conversion circuit, electrically coupled between the battery and the second switch unit, a control unit, electrically coupled to the audio circuit, the first switch unit, the second switch unit, the charging circuit and the DC-AC conversion circuit for controlling their operation, and being configured to generate a corresponding control command according to a determination result, wherein the determination result shows whether the UPS is in an on state, and the alert sound corresponding to the UPS in the on state is different from the alert sound corresponding to the UPS in an off state.

22. The power device as claimed in claim 21, wherein the speaker further comprises a second input terminal, and is further configured to emit sound according to the signals received by the first input terminal and the second input terminal, the audio circuit further comprises a second output terminal, the second output terminal is electrically coupled to the second input terminal, the audio circuit is further configured to generate a second PWM signal according to the audio file, and output the second PWM signal from the second output terminal, wherein the timing of the second PWM signal is different from the timing of the first PWM signal.

23. The power device as claimed in claim 22, further comprising a DAC circuit electrically coupled between the audio circuit and the speaker, the DAC circuit comprising a third input terminal, a fourth input terminal, a third output terminal, and a fourth output terminal, the third input terminal, the fourth input terminal, the third output terminal and the fourth output terminal being electrically coupled to the first output terminal, the second output terminal, the first input terminal and the second input terminal, respectively, the DAC circuit being configured to convert the first PWM signal and the second PWM signal into a first analog signal and a second analog signal, and output the first analog signal and the second analog signal from the third output terminal and the fourth output terminal, respectively.

24. The power device as claimed in claim 21, further comprising a DAC circuit electrically coupled between the audio circuit and the speaker, the DAC circuit comprising a second input terminal and a second output terminal, the second input terminal being electrically coupled to the first output terminal, the second output terminal being electrically coupled to the first input terminal, the DAC circuit being configured to convert the first PWM signal into a first analog signal, and output the first analog signal from the second output terminal.

25. The power device as claimed in claim 24, wherein the speaker further comprises a third input terminal, and is further configured to emit sound according to the signals received by the first input terminal and the third input terminal, the DAC circuit further comprises a third output terminal, the third output terminal is electrically coupled to the third input terminal, the DAC circuit is further configured to convert the first PWM signal into the first analog signal and a second analog signal, and output the first analog signal and the second analog signal from the second output terminal and the third output terminal, respectively.

26. The power device as claimed in claim 21, wherein the control unit and the audio circuit are further integrated into an integrated circuit.

27. The power device as claimed in claim 21, wherein the control unit is further configured to provide a web user interface, and the web user interface is configured for a user to set alert sounds under different determination results.

28. The power device as claimed in claim 21, further comprising a user interface electrically coupled to the control unit, wherein the user interface is configured for a user to set alert sounds under different determination results.

29. The power device as claimed in claim 28, wherein the user interface comprises a touch display panel.

30. The power device as claimed in claim 21, further comprising a DC-DC conversion circuit electrically coupled between the battery and the input terminal of the DC-AC conversion circuit.

31. The power device as claimed in claim 30, further comprising a PFC circuit electrically coupled between the first switch unit and the input terminal of the DC-AC conversion circuit.

32. The power device as claimed in claim 21, further comprising an automatic voltage regulation circuit configured on the bypass path.

* * * * *